US009239760B2

(12) United States Patent
Baone et al.

(10) Patent No.: US 9,239,760 B2
(45) Date of Patent: Jan. 19, 2016

(54) SYSTEMS AND METHODS FOR DETECTING, CORRECTING, AND VALIDATING BAD DATA IN DATA STREAMS

(71) Applicant: General Electric Company, Schenectady, NY (US)

(72) Inventors: Chaitanya Ashok Baone, Niskayuna, NY (US); Nilanjan Ray Chaudhuri, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 106 days.

(21) Appl. No.: 14/062,720

(22) Filed: Oct. 24, 2013

(65) Prior Publication Data

US 2015/0121160 A1    Apr. 30, 2015

(51) Int. Cl.
 G06F 11/07 (2006.01)
 G06F 11/14 (2006.01)
 G06Q 50/06 (2012.01)
 G06F 11/36 (2006.01)

(52) U.S. Cl.
 CPC ............ *G06F 11/1412* (2013.01); *G06Q 50/06* (2013.01)

(58) Field of Classification Search
 CPC ............ G06F 11/1412; G06F 11/0703; H02H 1/0061; H02H 7/263; H02H 1/04; H02H 1/0007; H02H 9/005; H04L 1/0045; H04L 43/50; G06Q 50/06
 See application file for complete search history.

(56) References Cited

U.S. PATENT DOCUMENTS

| | | | |
|---|---|---|---|
| 5,010,504 A | 4/1991 | Lee et al. | |
| 7,475,027 B2 | 1/2009 | Brand | |
| 7,734,451 B2 | 6/2010 | MacArthur et al. | |
| 7,904,261 B2 | 3/2011 | Atanackovic et al. | |
| 7,987,059 B2 * | 7/2011 | Gong et al. | 702/66 |
| 8,000,914 B2 | 8/2011 | Venkatasubramanian et al. | |
| 8,108,184 B2 * | 1/2012 | Fardanesh | 703/2 |
| 8,401,710 B2 | 3/2013 | Budhraja et al. | |
| 2009/0088990 A1 | 4/2009 | Schweitzer, III et al. | |
| 2012/0046889 A1 | 2/2012 | Sun et al. | |
| 2012/0136643 A1 | 5/2012 | Venkatasubramanian et al. | |
| 2012/0179301 A1 | 7/2012 | Aivaliotis et al. | |
| 2013/0173322 A1 | 7/2013 | Gray | |

FOREIGN PATENT DOCUMENTS

CN          103033789 A     4/2013

OTHER PUBLICATIONS

Rogers, Katherine Margaret, Data-Enhanced Applications for Power Systems Analysis, Dissertation—University of Illinois at Urbana-Champaign Illinois, 2011, pp. 253.

(Continued)

*Primary Examiner* — April Y Blair
*Assistant Examiner* — Dipakkumar Gandhi
(74) *Attorney, Agent, or Firm* — Nitin N. Joshi

(57) ABSTRACT

In one aspect, a computer system for managing occurrences of data anomalies in a data stream is provided. The computer system includes a processor in communication with the data stream. The processor is programmed to receive a first data stream from a phasor measurement unit. The processor is also programmed to calculate at least one singular value associated with the first data stream. The processor is further programmed to detect a first data anomaly within the first data stream using the at least one singular value. The first data anomaly occurs during a first time segment. The processor is also programmed to indicate the first time segment as containing the first data anomaly.

21 Claims, 17 Drawing Sheets

(56) References Cited

OTHER PUBLICATIONS

Almutairi, Abdulaziz, Enhancement of Power System Stability Using Wide Area Measurement System Based Damping Controller, Thesis submitted to The University of Manchester, 2010, pp. 250.

Guha, Sudipto et al., Correlating Synchronous and Asynchronous Data Streams, SIGKDD, Aug. 24-27, 2003, Washington, D.C., pp. 6.

European Search Report and Written Opinion issued in connection with corresponding EP Application No. 14189789.2-1958 dated Mar. 4, 2015.

* cited by examiner

SYSTEMS AND METHODS FOR DETECTING, CORRECTING, AND VALIDATING BAD DATA IN DATA STREAMS

BACKGROUND

The present disclosure relates generally to data streams within power transmission systems and, more specifically, to systems and methods for detecting, correcting, and validating bad data in data streams originating from phasor measurement units (PMU) within power transmission systems.

In some known electrical power transmission systems, PMU's measure values such as current and voltage at a point within the transmission system. These values are collected and transmitted from the PMU to a centralized system, such as a phasor data concentrator (PDC), through a communications channel such as a data network. Such data assists operators of power transmission systems in analyzing system conditions and overall system stability. However, errors may occur during collection or transmission of the data which may present erroneous, missing, or otherwise non-accurate data, i.e., "bad-data anomalies," within the PMU's data stream to the PDC. If these anomalies in the data stream are not noticed or accounted for, operators may take improper actions.

BRIEF DESCRIPTION

In one aspect, a computer system for managing occurrences of data anomalies in a data stream is provided. The computer system includes a processor in communication with the data stream. The processor is programmed to receive a first data stream from a phasor measurement unit. The processor is also programmed to calculate one or more singular values associated with the first data stream. The processor is further programmed to detect a first data anomaly within the first data stream using the one or more singular values. The first data anomaly occurs during a first time segment. The processor is also programmed to indicate the first time segment as containing the first data anomaly.

In another aspect, at least one non-transitory computer-readable storage media having computer-executable instructions embodied thereon are provided. When executed by at least one processor, the computer-executable instructions cause the processor to receive a first data stream from a phasor measurement unit. The computer-executable instructions also cause the processor to calculate one or more singular values associated with the first data stream. The computer-executable instructions further cause the processor to detect a first data anomaly within the first data stream using the one or more singular values. The first data anomaly occurs during a first time segment. The computer-executable instructions also cause the processor to indicate the first time segment as containing the first data anomaly.

In yet another aspect, a computer-based method of managing occurrences of data anomalies in a data stream using a computing device including at least one processor is provided. The method includes receiving, by the computing device, a first data stream from a phasor measurement unit. The method also includes calculating, by the processor, one or more singular values associated with the first data stream. The method further includes detecting a first data anomaly within the first data stream using the one or more singular values. The first data anomaly occurs during a first time segment. The method also includes indicating the first time segment as containing the first data anomaly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
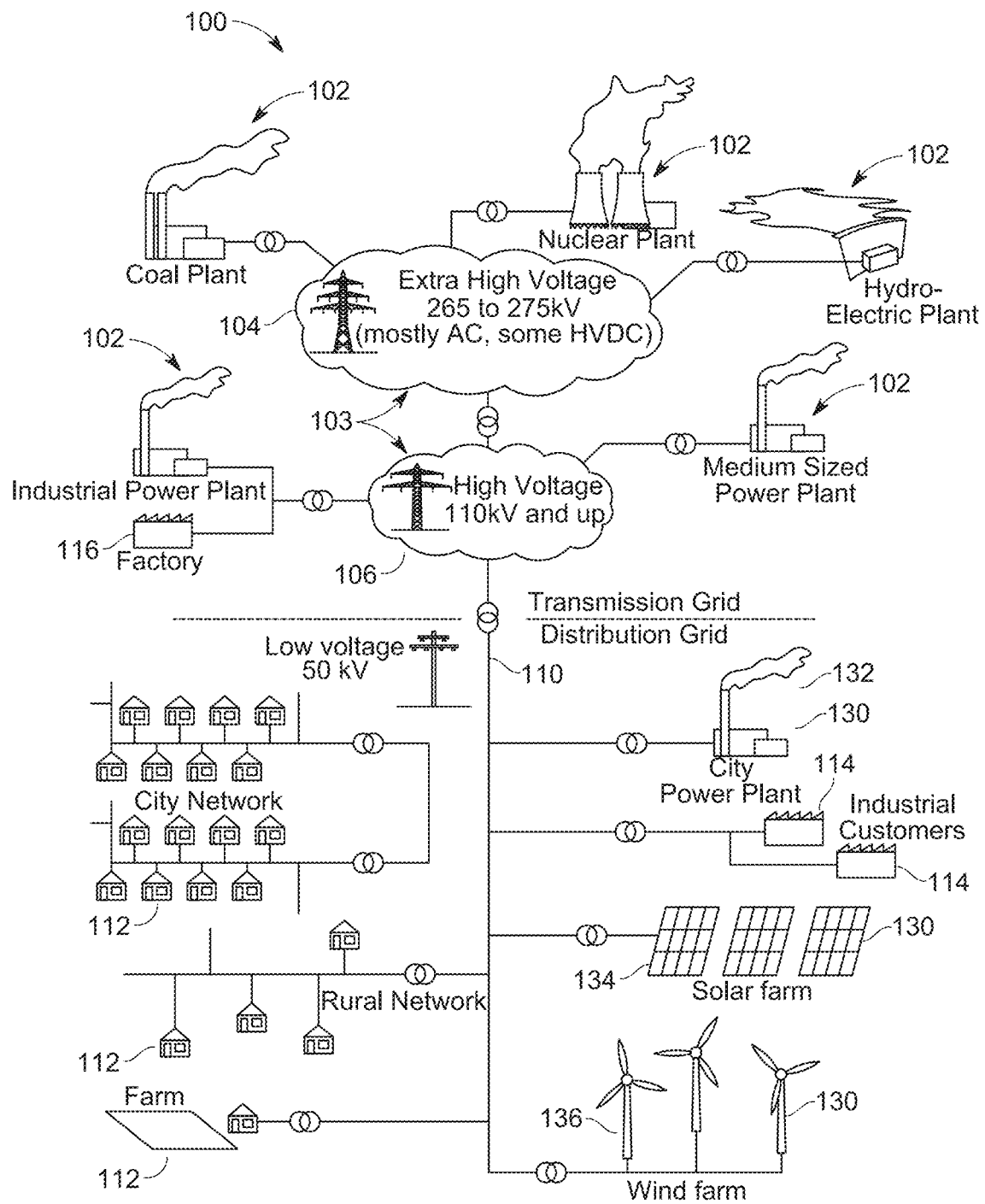
FIG. 1 is a general schematic diagram of both an exemplary transmission network and an exemplary electrical power distribution system with distributed generators (DG)

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "operator" includes any person in any capacity associated with operating and maintaining electric distribution system, including, without limitation, users of the systems described herein, shift operations personnel, maintenance technicians, and system supervisors.

As used herein, the term "data stream" is used generally to refer to an ordered series of data values that, for example, are collected from one device and sent to another device across a communications network. More specifically, in some embodiments, a phasor management unit (PMU) captures data values, such as current and voltage levels, from a particular point in an electric power transmission network. In some embodiments, these values are collected at a frequency of 60 times per second, i.e., one value collected every $\frac{1}{60}^{th}$ second. The PMU continuously sends this series of collected values as a "data stream" to another computing device, such as a phasor data concentrator (PDC), for further processing.

The methods and systems described herein include analyzing streams of data sent from a PMU to a PDC or other management system within a power transmission network. These systems and methods are directed at detecting anomalies within the data stream, correcting the anomalies, and validating the reliability of the corrections. A data anomaly, or "bad data," may be, for example and without limitation, missing data, i.e., data not received by the PDC, or data not consistent with or otherwise indicative of actual values on the power network, i.e., inaccurate and/or erroneous data values. In some embodiments, the PDC receives a stream of data from a given PMU and the data stream contains one or more anomalies. The PDC uses singular value decomposition (SVD) on the data stream and detects anomalies by examining one or more singular values of the data stream. An aberration in one or more singular values may indicate an anomaly within the data. Also, in some embodiments, a replacement value is calculated for the anomalous data. Further, in other embodiments, the replacement value is validated and/or corrected by comparing the replacement value with a validation value. The validation value is computed by comparing the data stream with the anomaly to values from another data stream prior to and at the time of the anomaly. As such, replacement values may be inserted into the data stream with an improved level of confidence and reliability.

The known process of singular value decomposition (SVD) is a mathematical tool of linear algebra that may be used in signal processing. SVD performs a factorization of a matrix M into three component matrices, U, Σ, and V. The diagonal entries of matrix Σ are the "singular values" of the matrix M, whose analytical uses are described in greater detail herein.

FIG. 1 is a general schematic diagram of an exemplary electrical power network 100. Electrical power network 100 typically includes power plants 102 outputting power through a transmission grid 103, which includes an extra high voltage transmission grid 104 and a high voltage transmission grid 106 through which power is transmitted to an exemplary electrical power distribution system 110. Electrical power network 100 may include, without limitation, any number, type and configuration of extra high voltage transmission grids 104, high voltage transmission grids 106, and electrical power distribution systems 110, as well as any number of consumers within electrical power distribution system 110, high voltage transmission grid 106, e.g., greater than 110-265 kilovolts (kV), and extra high voltage grid 104, e.g., greater than 265 kV.

Electrical power distribution system 110 includes low wattage consumers 112 and industrial medium wattage consumers 114. Electrical power distribution system 110 also includes distributed generators 130, including a city power plant 132, a solar farm 134, and a wind farm 136. While electrical power distribution system 110 is shown with an exemplary number and type of distributed generators 130, electrical power distribution system 110 may include any number and type of distributed generators 130, including, without limitation, diesel generators, micro-turbines, solar collector arrays, photo-voltaic arrays, and wind turbines.

Figure 2:
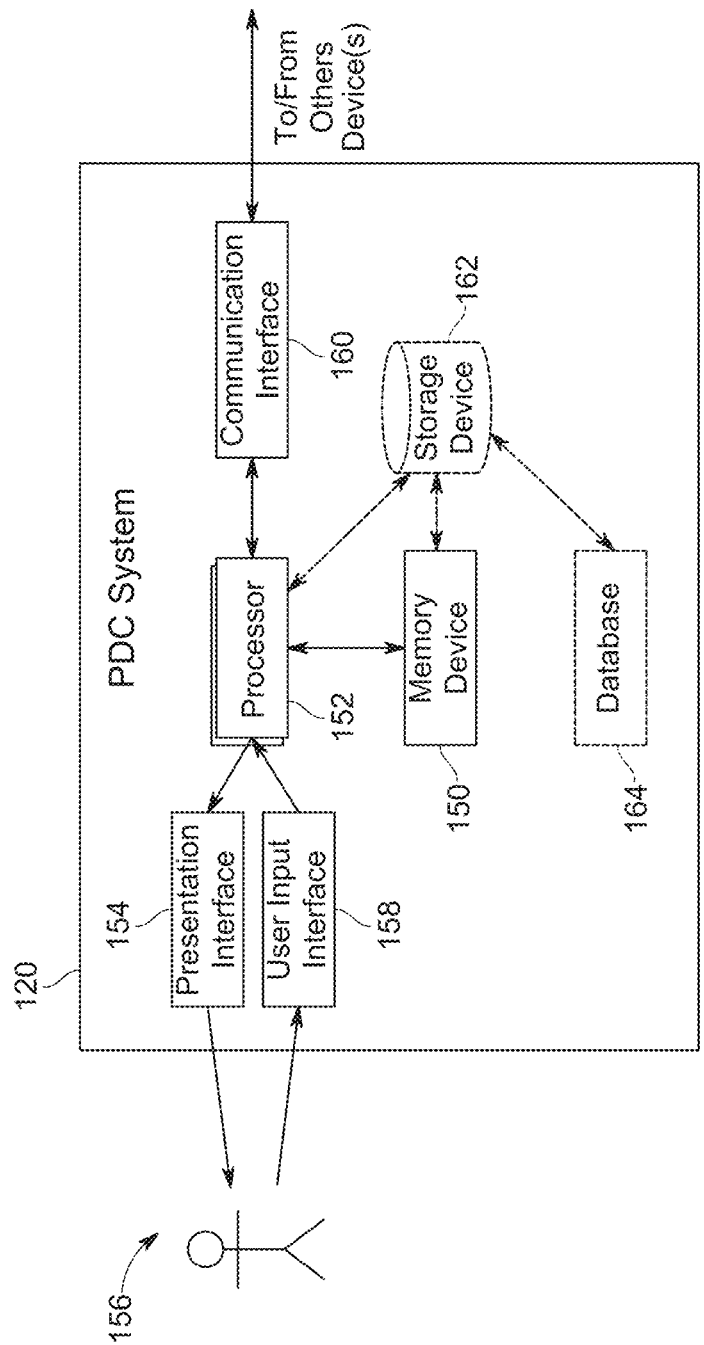
FIG. 2 is a block diagram of an exemplary PDC system used to analyze the electrical power transmission network shown in FIG. 1.

FIG. 2 is a block diagram of an exemplary PDC system 120 used to analyze transmission grid 103 (shown in FIG. 1).

Alternatively, any computer architecture that enables operation of PDC system 120 as described herein may be used. PDC system 120 facilitates collecting, storing, analyzing, displaying, and transmitting data and operational commands associated with configuration, operation, monitoring and maintenance of components in transmission grid 103.

Also, in the exemplary embodiment, PDC system 120 includes a memory device 150 and a processor 152 operatively coupled to memory device 150 for executing instructions. In some embodiments, executable instructions are stored in memory device 150. PDC system 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

Further, in the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 150 may be configured to store a variety of operational data associated with components and operational data transmitted from PMU's (not shown in FIG. 1) associated with components of transmission grid 103 including, without limitation, voltage and current at points of interest in transmission grid 103, magnitude and phase angles, i.e., phasors, of the sine waves found in electricity, and time synchronization data.

In some embodiments, PDC system 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown), e.g., an audio adapter and/or a speaker.

In some embodiments, PDC system 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel, e.g., a touch pad or a touch screen. A single component, such as a touch screen, may function as both a display device of presentation interface 154 and user input interface 158.

Further, a communication interface 160 is coupled to processor 152 and is configured to be coupled in communication with one or more other devices such as, without limitation, components in transmission grid 103, another PDC system 120, one or more PMU's (not shown in FIG. 2), and any device capable of accessing PDC system 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, a communication interface 160 of one PDC system 120 may transmit transaction information to communication interface 160 of another PDC system 120 and/or PMU's (not shown in FIG. 2). PDC system 120 may be web-enabled for remote communications, for example, with a remote desktop computer (not shown). In the exemplary embodiment, communications interface 160 receives and processes signals from PMU's based on communications protocols governed by the Institute of Electrical and Electronics Engineers (IEEE) C37.118-2 standard.

Also, presentation interface 154 and/or communication interface 160 are both capable of providing information suitable for use with the methods described herein, e.g., to user 156 or another device. Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in PDC system 120. For example, PDC system 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to PDC system 120 and may be accessed by a storage interface (not shown).

Moreover, in the exemplary embodiment, database 164 contains a variety of static and dynamic operational data associated with components, some of which may be transmitted from PMU's (not shown in FIG. 2) associated with components in transmission grid 103 including, without limitation, voltage and current values at points of interest in transmission grid 103, magnitude and phase angles of the sine waves found in electricity, and time synchronization data.

The embodiments illustrated and described herein as well as embodiments not specifically described herein but within the scope of aspects of the disclosure, constitute exemplary means for recording, storing, retrieving, and displaying operational data associated with an electrical power transmission system. For example, PDC system 120, and any other similar computer device added thereto or included within, when integrated together, include sufficient computer-readable storage media that is/are programmed with sufficient computer-executable instructions to execute processes and techniques with a processor as described herein. Specifically, PDC system 120 and any other similar computer device added thereto or included within, when integrated together, constitute an exemplary means for recording, storing, retrieving, and displaying operational data associated with transmission grid 103.

Figure 3:
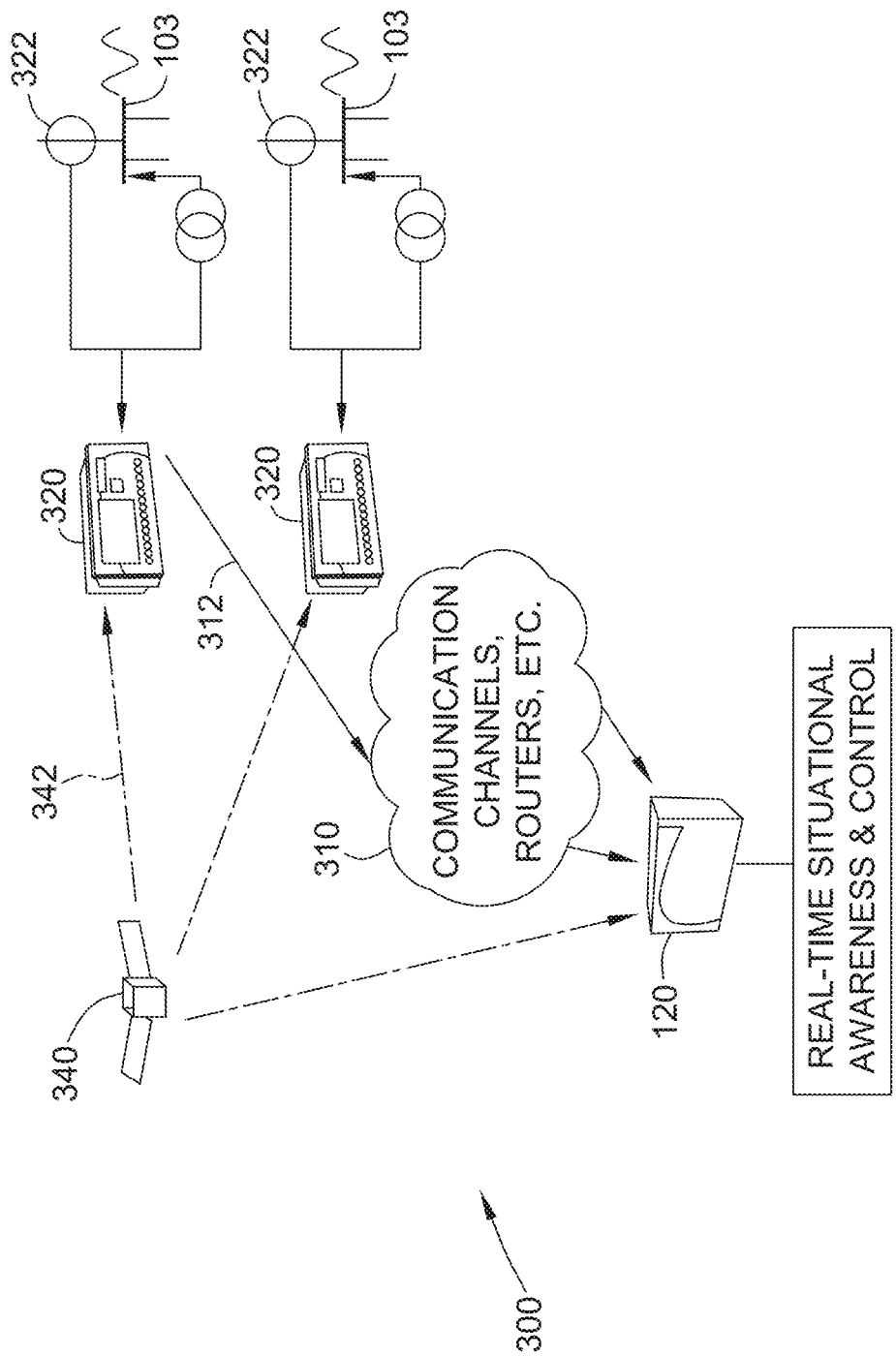
FIG. 3 is a data flow diagram of an exemplary wide-area measurement system (WAMS), including a plurality of Phasor Measurement Units (PMU's), for monitoring and managing the electrical power network shown in FIG. 1 using the PDC system shown in FIG. 2.

FIG. 3 is a data flow diagram of an exemplary wide-area measurement system (WAMS) 300, including a plurality of Phasor Measurement Units (PMU's), for monitoring and managing electrical power network 100 (shown in FIG. 1). WAMS 300 includes a data network 310 which communicatively couples one or more PMU's 320 and at least one PDC system 120 using data links 312. Each PMU 320 is communicatively coupled to transmission grid 103 (shown in FIG. 1) at a particular sampling point, such as substation 322. Further, in some embodiments, PMU's 320 and PDC 120 are communicatively coupled to a time synchronization source such as, for example, a satellite 340. A wireless data link 342 allows PMU 320 and PDC 120 to communicate with satellite 340 to facilitate synchronization of samples collected using known methods of time stamping.

During operation, in the exemplary embodiment, PMU 320 measures and/or collects data from sample point 322 within transmission grid 103. Such data may be, for example, phasor data. PMU 320 may sample data values many times per second, such as between 10 and 60 samples per second. PMU 320 also synchronizes time with satellite 340 such that the data values that are collected may be time stamped, allowing values from multiple PMU's 320 to be time-correlated together during analysis. PMU 320 transmits the measured values as a "data streams" across data network 310 to a management device, such as PDC system 120. PDC system 120 uses this data stream for operational tasks, such as various transmission analysis tasks. However, these data streams may contain "anomalous data." As used herein, the terms "bad data," "anomalous data," and "data anomaly" refers generally and broadly to data that is somehow illegitimate, such as, for example and without limitation, missing data, corrupted data, and data outliers that may arise due to noise, equipment maloperation, or other sources. Such data anomalies may arise, for example, from potential transformers (PT's), current transformers (CT's), substation wiring, PMU's 320, routers, fiber optic cables, servers.

Figure 4:
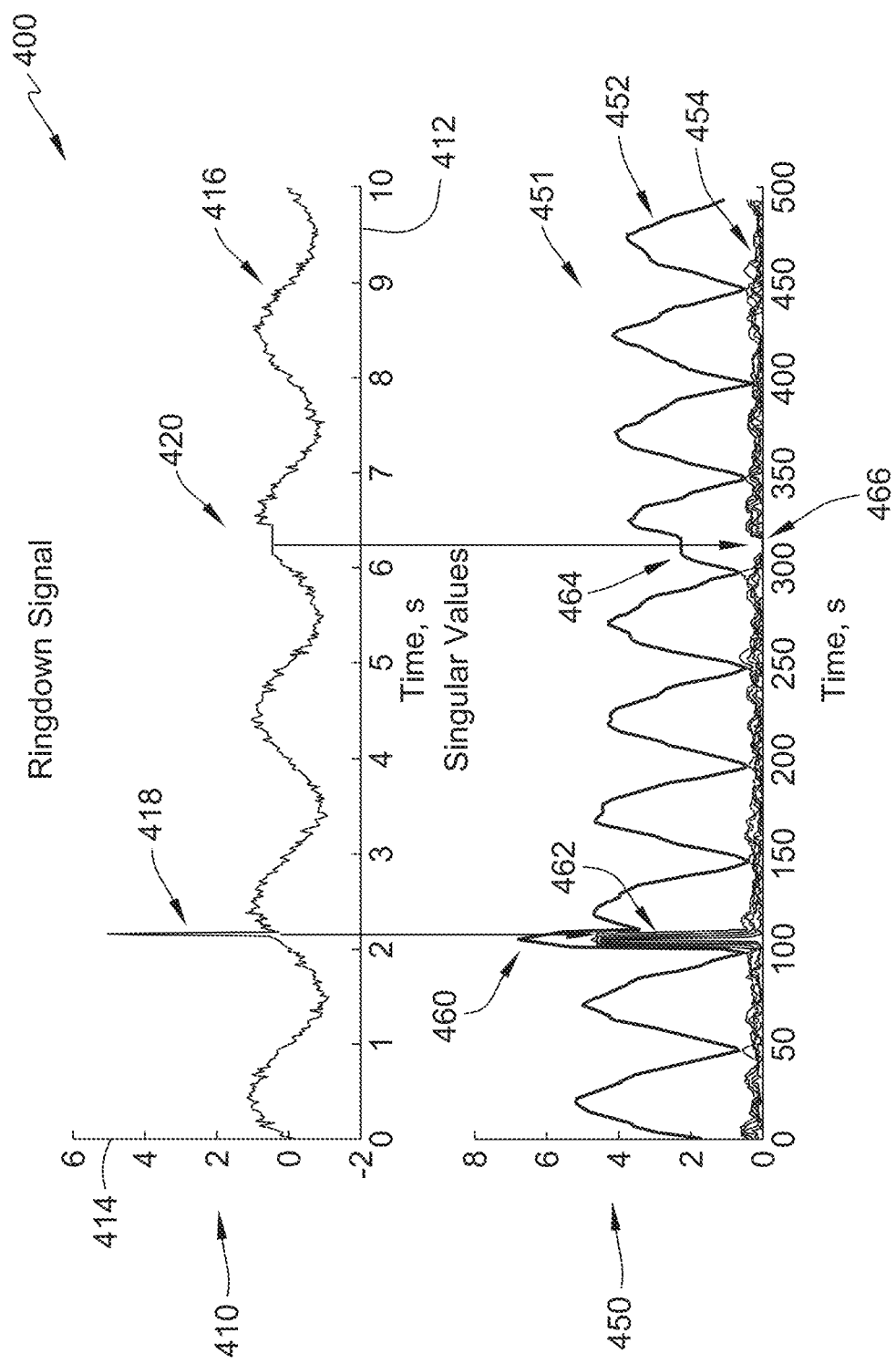
FIG. 4 is a diagram illustrating two time-correlated graphs, including a data values graph for a data stream collected from the PMUs shown in FIG. 3 and a windowed Singular Value Decomposition (SVD) graph computed using the PDC system shown in FIG. 2.

FIG. 4 is a diagram 400 illustrating two exemplary time-correlated graphs, including a data values graph 410 for a data stream collected from PMUs 320 (shown in FIG. 3) and a windowed Singular Value Decomposition (SVD) graph 450 computed using PDC system 120 (shown in FIG. 2). Data values graph 410 plots a data stream comprising a series of data points received from a PMU 320 (shown in FIG. 3) across an X-axis 412 of time, which defines a curve 416. With the exemplary data from PMU 320, illustrated by curve 416, two instances of data anomalies are evident: (a) a data spike 418 at a time shortly after time=2 seconds, and (b) missing data 420 at a time shortly after time=6 seconds. The systems and methods described herein are configured to detect such anomalies.

During operation, in the exemplary embodiment, a management system such as PDC system 120 receives a data stream from PMU 320. The data values from the data stream are illustrated by curve 416. PDC system 120 operates on the data stream. More specifically, PDC system 120 performs SVD on a matrix made up of recent data samples from the data stream many times per second. In some embodiments, a single data signal is analyzed from, for example, a single PMU 320. Each row of the matrix includes data samples from the data stream, but staggered in time in relation to the other rows. The number of rows, m, and number of columns, $N_w$, of the matrix may be adjustable parameters, and may be selected by the operator based on the nature of the system and/or the nature of the signal, or other factors. For example, consider the following matrix Y for the data stream $y_1$ associated with PMU 320:

$$Y = \begin{bmatrix} y_1(k) & y_1(k-1) & \ldots & y_1(k-N_w-1) \\ y_1(k-1) & y_1(k-2) & \ldots & y_1(k-N_w-2) \\ \vdots & \vdots & \vdots & \vdots \\ y_1(k-m-1) & y_1(k-m-2) & \ldots & y_1(k-N_w-1-m-1) \end{bmatrix}, \quad (1)$$

where k is an increasing index of the current, i.e., most recent, time sample, $y_1(k)$ represents the time sample value of the $k^{th}$ time sample, and $y_1(k-1)$ represents the previous time sample, etc. Accordingly, the number of columns $N_w$ is the window size, and the top row represents the most recent $N_w$ data samples. Each row below the top row represents a sliding window of time samples for data stream $y_1$, but staggered some number of time samples behind the top row. In the exemplary embodiment, the second row is one time sample behind the first, the third row is one time sample behind the second, etc., until m rows are constructed. It other embodiments, the lower rows may be staggered by more than one time sample. In the exemplary embodiment, 50 samples are collected every second. PDC system 120 updates the matrix each time a new sample is received, thereby shifting time samples by one, and then performs SVD after every sample. The SVD process generates one or more singular values 451, each of which is illustrated by a separate curve plotted on SVD graph 450. The application of SVD to the data stream represented by curve 416 is described in greater detail below.

In the exemplary embodiment, the largest singular value of the data stream is illustrated by curve 452, and the other singular values are illustrated by additional curves 454. Curve 452 includes a spike 460 during the same timeframe of data spike 418 shown in graph 410, i.e., the largest singular value spikes synchronously with the spike in the actual data values. There is also a pronounced spike 462 in each of the exemplary additional curves 454 during the same timeframe, i.e., the other singular values spike as well. Further, the largest singular value curve 452 also includes a plateau 464 during the same time frame of missing data 420 shown in graph 410, i.e., the largest singular value curve is malformed synchronously with the missing data. There is also a valley 466 in the additional curves 454 during the same timeframe. As illustrated by the exemplary graphs 410 and 450, the singular values 451 of a data stream 416 present indications of data anomalies.

In some embodiments, multiple data streams from multiple PMU's 320 may be analyzed simultaneously. For example, a matrix may be constructed in which each row corresponds to a data stream, and SVD may be performed on the matrix to detect data anomalies in each or any of the data streams. For example, consider the following matrix Y for a plurality, p, of data stream $y_1$-$y_p$ associated with p PMU's 320:

$$Y = \begin{bmatrix} y_1(k) & y_1(k-1) & \ldots & y_1(k-N_w-1) \\ y_2(k) & y_2(k-1) & \ldots & y_2(k-N_w-1) \\ \vdots & \vdots & \vdots & \vdots \\ y_p(k) & y_p(k-1) & \ldots & y_p(k-N_w-1) \end{bmatrix}, \quad (2)$$

where $y_p$ represents the $p^{th}$ data stream, k is an increasing index of the current, i.e., most recent time sample, $y_p(k)$ represents the time sample value of the $k^{th}$ time sample for the $p^{th}$ data stream, and $y_p(k-1)$ represents the previous time sample for the $p^{th}$ data stream, etc. As such, each row represents a sliding window of data values for a single data stream, the number of rows is equal to the number of data streams, and the window size, i.e., the number of columns, is a pre-selected parameter chosen by the operator based on the nature of the system and type of signals. In the exemplary embodiment, 50 samples are collected every second from each PMU 320. PDC system 120 updates the matrix each time new samples are received, thereby shifting time samples by one, and then performs SVD after every sample.

Figure 5:
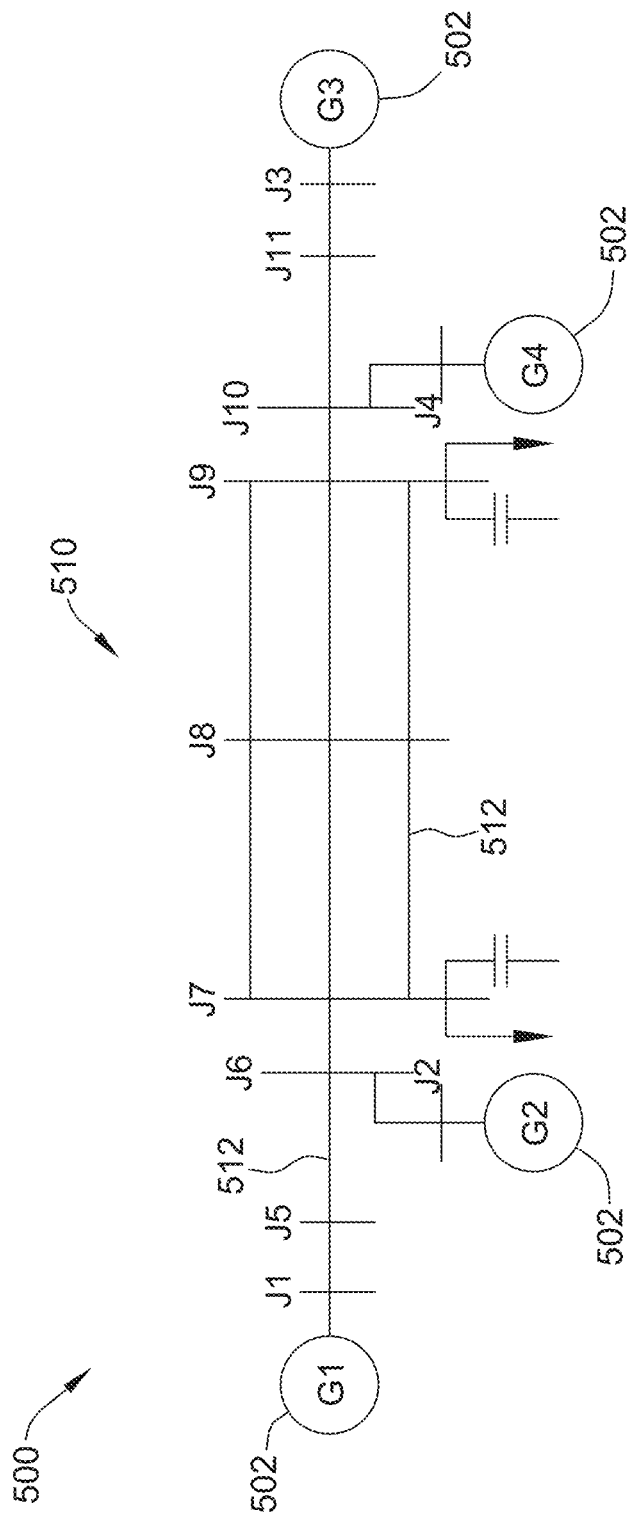
FIG. 5 is a diagram of an exemplary power transmission system within the electrical power system shown in FIG. 1, including a plurality of electric power generators, that may be monitored using the WAMS shown in FIG. 3.

FIG. 5 is a diagram of an exemplary power transmission system 500 within electrical power system 100 (shown in FIG. 1), including a plurality of electric power generators, that may be monitored using WAMS 300 (shown in FIG. 3). In some embodiments, transmission system 500 is similar to transmission system 103 (shown in FIG. 1). In the exemplary embodiment, transmission system 500 includes four power generators 502, labeled "G1", "G2", "G3", and "G4." Power generators 502, in some embodiments, are similar to power plants 102 (shown in FIG. 1).

Transmission system 500 also includes a transmission network 510 that connects power generators 502 to consumers of power (not shown in FIG. 3), such as, for example, factories 116 (shown in FIG. 1) and distribution networks 110 (shown in FIG. 1). Transmission network 510 includes a series of transmission lines 512, also referred to herein as just "lines," that feed power to consumers. Transmission lines 512 come together at junctions J1-J11, also commonly referred to as "nodes" or "buses." Junctions J1-J11 may be, for example, a power substation and/or a transformer. Each line 512 is connected to two junctions, one at either end of the line. For example junction J1 is connected to junction J5 by one line. In the exemplary system, transmission system 500 includes 4 power generators 502 feeding power to consumers through 14 lines 512 and 11 junctions J1-J11.

In the example embodiment, PMU's (not shown in FIG. 5) are located at various locations in the system, e.g., at Junctions J1-J11, to monitor key power system quantities, such as bus voltages, phase angles, and currents. To test bad data detection, a simulation is conducted where Gaussian white noise is injected at the load inputs, e.g., at bus J1. To represent a typical transient condition, a self-clearing fault that lasts for a duration of 5 cycles (1 cycle=1/60 second) is simulated at bus J8. From these measurements, line power flows and voltage angle difference between buses and generated speeds are calculated using known equations.

FIGS. 6-9 illustrate an exemplary analysis of PMU data signals from generators G1-G4 in which bad data, i.e., a data anomaly, is injected at two different points, each representing different conditions that may be experienced within electrical power system 100 (shown in FIG. 1).

Figure 6:
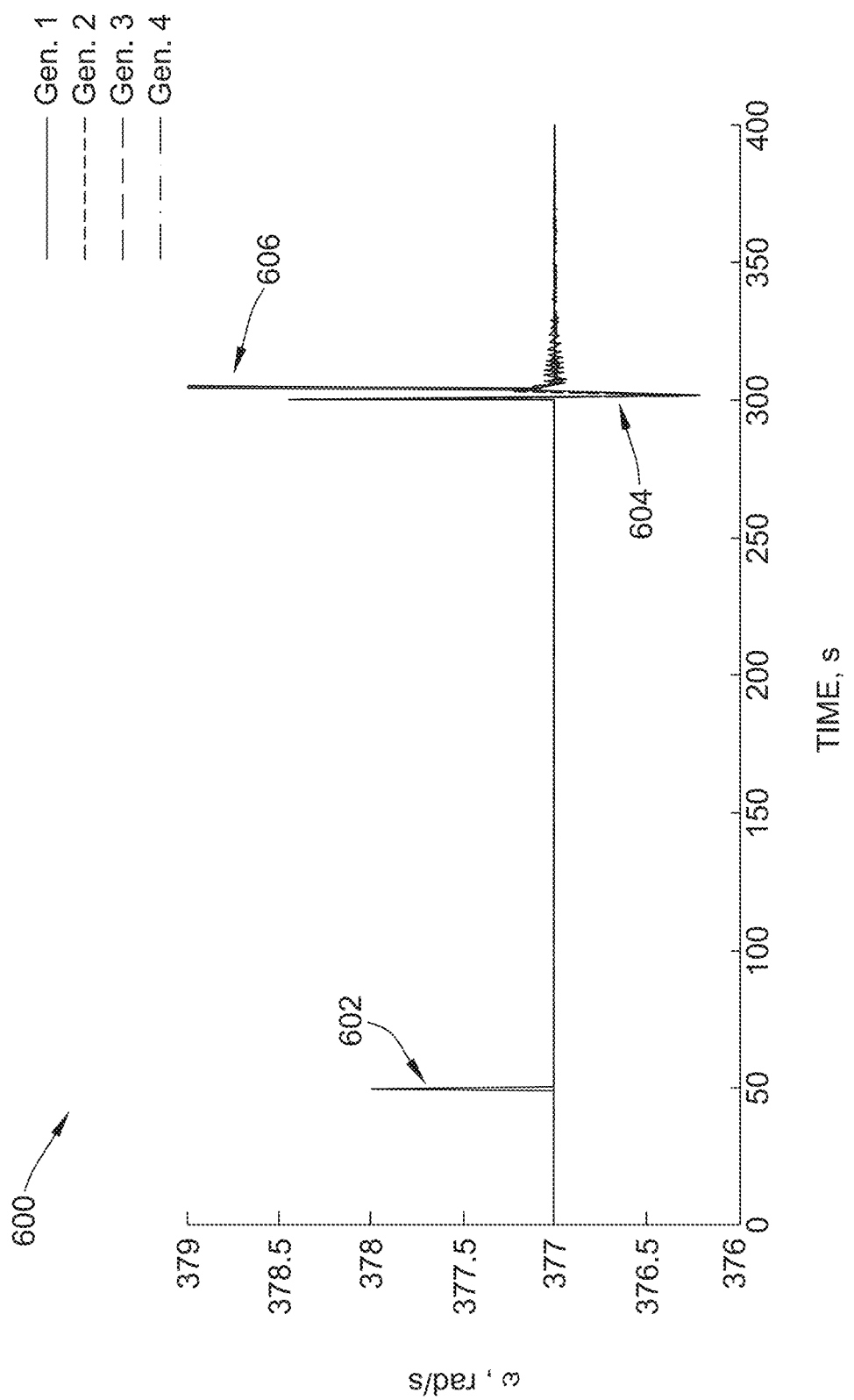
FIG. 6 is an exemplary graph of a PMU data signal for generator speeds of the generators shown in FIG. 5 in which bad data is injected.

FIG. 6 is an exemplary graph 600 of a PMU data signal for generator speeds of generators G1-G4 in which bad data is injected. As used herein, "bad data" generally refers to an event in which some corruption of a data signal is introduced. As used herein, the terms "bad data", "bad data event", and "bad data anomaly" may be used interchangeably. For example, presume a data anomaly is injected into the data signal from generator G2's 304 speed, the first at a time t=50 seconds and second at t=305 seconds. Further, presume that the transmission network's conditions at approximately time t=50 seconds are ambient conditions, i.e., steady state conditions of the network, and that the conditions at approximately time t=305 seconds are transient conditions, i.e., conditions during or just after a disturbance event on the transmission network, such as a network segmentation. During ambient conditions, i.e., approximately time t=50 seconds, the first data anomaly is distinguishable as spike 602. At approximately time t=300, a transient condition occurs that causes generator speeds for all 4 generators G1-G4 to fluctuate from approximately time t=300 seconds to t=340 seconds, as seen by the oscillation 604. The second data anomaly is introduced at time t=305 seconds, during the transient condition, and is visible as spike 606 of just the signal for generator G2.

Figure 7:
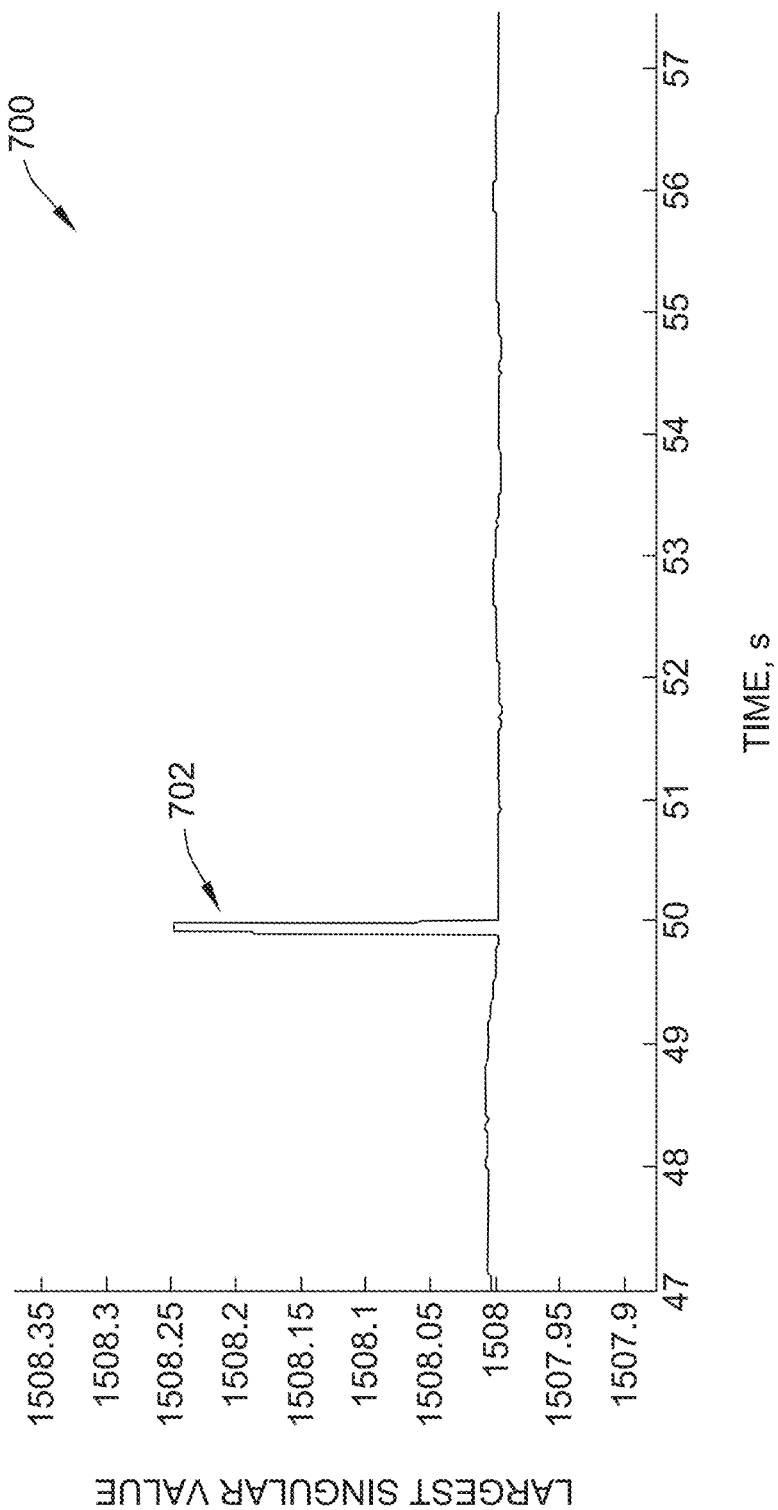
FIG. 7 is an exemplary graph illustrating a plot of the largest singular value of a matrix Y around a bad data anomaly during an ambient condition.

FIG. 7 is an exemplary graph 700 illustrating a plot of the largest singular value of a matrix Y along the Y-axis around a bad data anomaly during an ambient condition, i.e., at approximately time t=50 seconds. In the exemplary embodiment, bad data detection includes constructing a matrix Y. Each row of Y represents a generator, e.g., generators G1-G4 (shown in FIG. 6), and the columns of Y include generator speed samples of the generators. As such, the number of columns represents the window length. For each data sample, the Y matrix is moved by one sample, while keeping the number of columns the same. For each Y matrix, SVD is performed, and the largest and smallest singular values are determined. FIG. 7 shows the plot of the largest singular value at approximately time t=50 seconds. A spike 702 in the largest singular value corresponds with the timing of the bad data.

Figure 8:
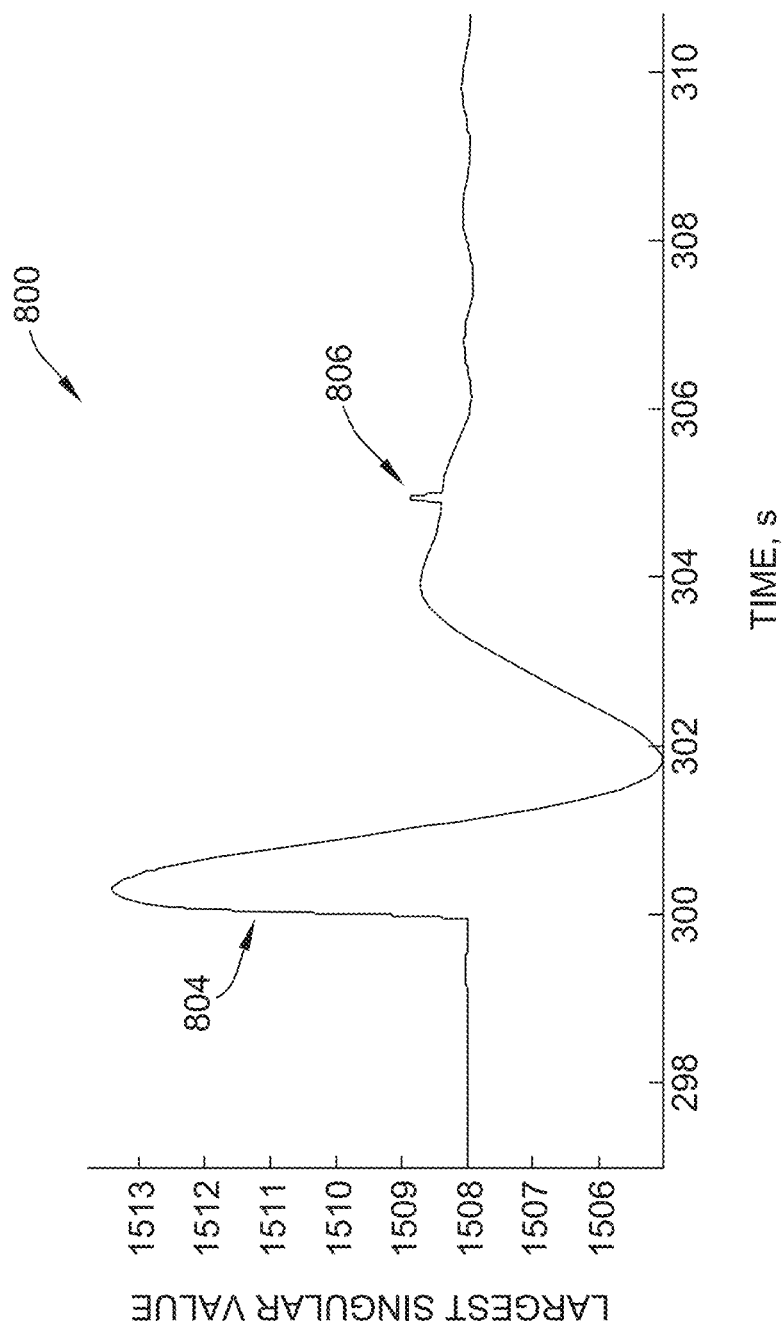
FIG. 8 is another exemplary graph illustrating a plot of the largest singular value of the matrix Y around another bad data anomaly during a transient condition.

FIG. 8 is another exemplary graph 800 illustrating a plot of the largest singular value of the matrix Y along the Y-axis around another data anomaly during a transient condition, i.e., approximately time t=305 seconds. Spikes due to bad data during transient conditions, such as spike 702 (shown in FIG. 7), are relatively easy to distinguish, because the largest singular value is relatively stable. However, during transient conditions, the largest singular value plot is also naturally fluctuating. In FIG. 8, the transient condition starts at approximately time t=300 seconds, at 804. Spike 806 is visible at approximately time t=305, corresponding with the timing of the second data anomaly. The peak of spike 806, however, is small in comparison to fluctuations such as those associated with natural transient conditions.

Figure 9:
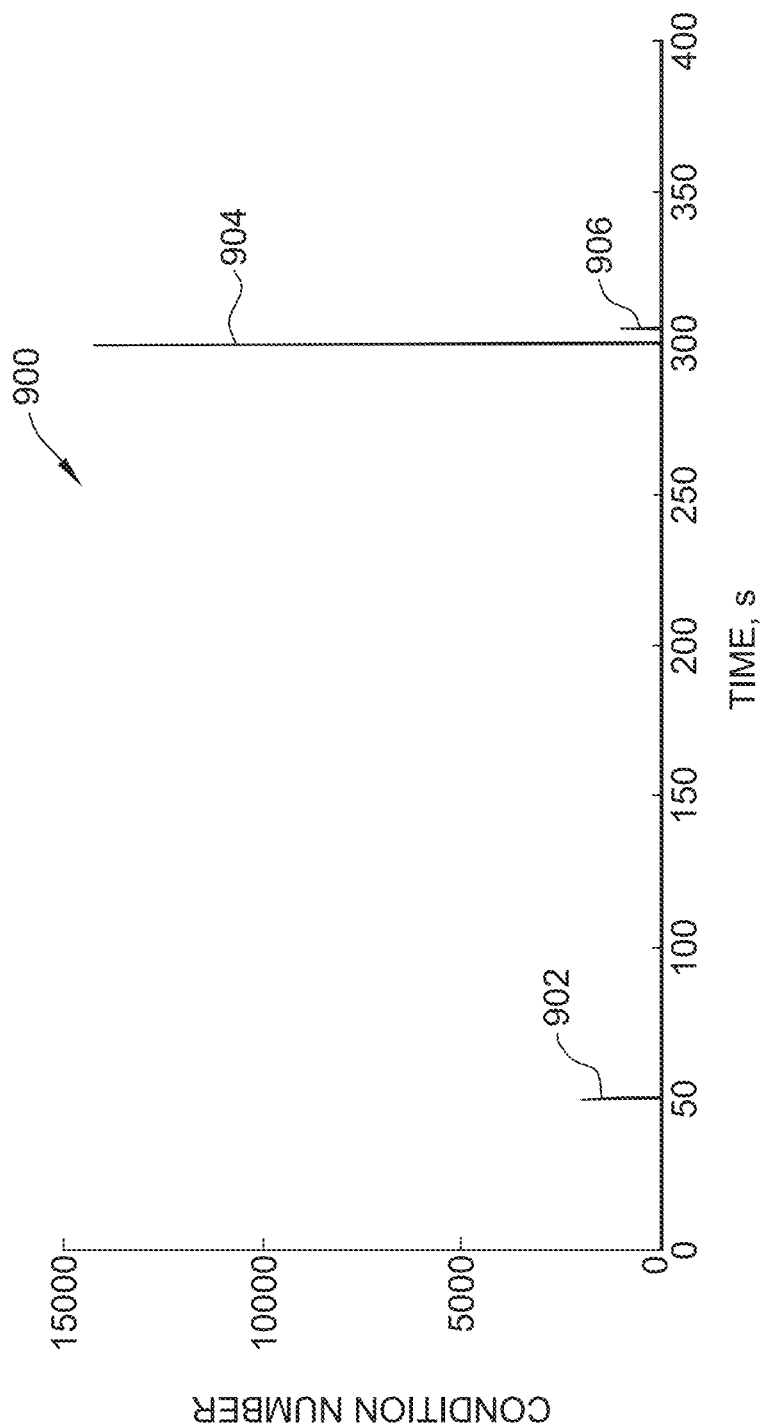
FIG. 9 is an exemplary graph illustrating a plot of a condition number for the matrix Y.

FIG. 9 is an exemplary graph 900 illustrating a plot of a condition number for the matrix Y. In the exemplary embodiment, to differentiate spike 806 (shown in FIG. 8) from a natural peak or valley due to transient condition fluctuations, a condition number of the Y matrix is monitored. The condition number is computed as the ratio between the largest and smallest singular values. Three spikes are evident based on the plot of the condition number: a first bad data spike 902 at approximately time t=50 seconds; a transient condition spike 904 at approximately t=300 seconds; and a second bad data spike 906 at approximately t=305 seconds. The magnitude of the transient condition spike 904 is much larger for a system disturbance as compared to during bad data. In the example embodiment, the peak condition number for transient condition spike 904 is approximately 14,000, where both the first bad data spike 902 and the second bad data spike 906 are at or below 2000. Thus, by monitoring the condition number and, for example, implementing a threshold value check such as, for example, 7,000, it is possible to distinguish between a system disturbance and a bad data.

Further, in some embodiments, once an anomaly is identified, replacement data values are identified and inserted into the data stream. For example, prior to using values from the data stream for other management purposes, PDC system 120 may calculate replacement values for one or more data values associated with the anomaly. In some embodiments, replacement values represent an approximation of what the data values might have been had the anomaly not occurred. As such, insertion of replacement values attempts to "correct" the anomaly.

Data anomalies such as those described above may occur during differing types of network conditions. In some situations, an anomaly may occur while the network is in a stable state, i.e., during ambient conditions. In other situations, an anomaly may occur while the network is in a period of disturbance, i.e., during transient conditions, also referred to herein as "disturbance conditions." As used herein, the term "disturbance condition" refers generally to data anomalies that occur during an actual disturbance on the transmission network, such as might occur during a segmentation on the network, or a power generator suddenly going offline, or some other transient condition that causes a significant fluctuation on the network. Further, as used herein, the term "ambient condition" refers to more normal, "steady-state" operating conditions in which the transmission network is not undergoing a significant disturbance, such as when there are only small variations in load demands. Ambient conditions are typified by high noise within the signal. Disturbance conditions are typified by high signal-to-noise ratio within the signal.

Accordingly, in some embodiments, data anomalies are classified as occurring under either an ambient condition or a disturbance condition, and replacement values are computed using differing techniques based on this anomaly classification type.

As such, in some embodiments, replacement values for anomalies are computed using one or more of known interpolation or extrapolation techniques. In other embodiments, replacement values for anomalies are computed using a regression-based transfer function. The transfer function model is based on curve fitting using least error squares. The model is built using good data values such that once bad data is encountered in the data stream, a more accurate data value may be computed using the model.

In the exemplary embodiment, a vector is constructed, which is given by:

$$c_i = \sigma_i u_i, \quad (3)$$

where $\sigma_i$ is the largest singular value at time sample i, and $u_i$ is the left singular vector corresponding to $\sigma_i$. Vector $c_i$ is normalized by the largest singular value at the nominal condition (t=0) such that vector $c_i$ has an absolute value of 1, i.e., since singular vector $u_i$ is also normalized. A scalar quantity is obtained at each time step, and this quantity is scaled by the nominal value of the measurement being processed. This quantity is the corrected value.

Figure 10:
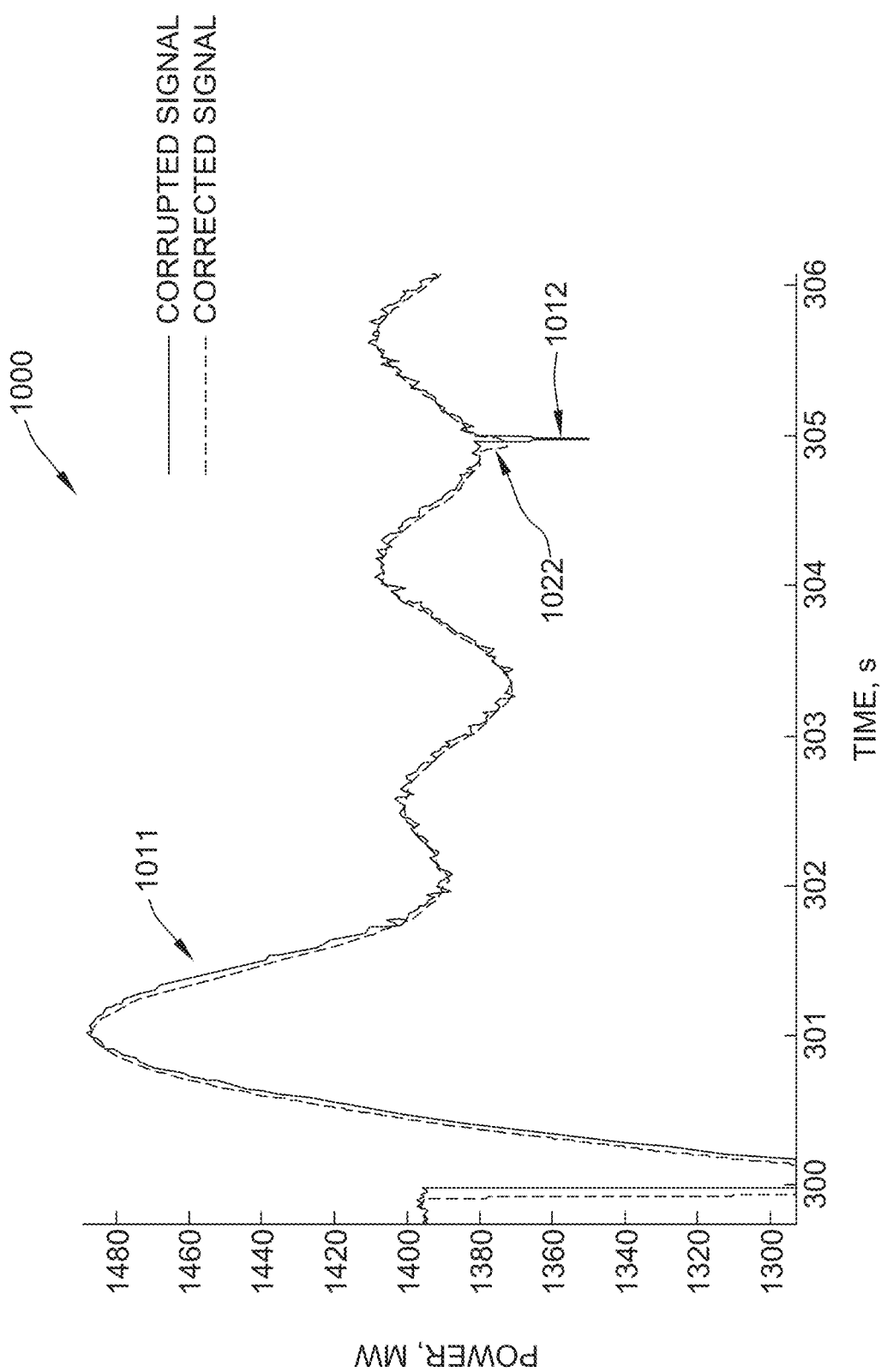
FIG. 10 is a graph of a power flow data signal during a transient condition with corrupted data inserted into the data signal.

FIG. 10 is an exemplary graph 1000 of a power flow data signal during a transient condition with corrupted data inserted into the signal. In the exemplary embodiment, graph 1000 includes two plots: a corrupted signal 1010 and a corrected signal 1020. Corrupted signal 1010 represents the actual values received during operation, but also includes bad data. Bad data is inserted into corrupted signal 1010 at time t=305 seconds, and thereby manifests a dip 1012 in corrupted signal 1010. Corrected signal 1020 represents the quantity obtained after performing computations using equation (1) and the process described above on corrupted signal 1020. Prior to the bad data at time t=305 seconds, such as at element 1011, the values for corrupted signal 1010 and corrected signal 1020 are nearly identical. During the bad data event, i.e., at approximately time t=305 seconds, corrected signal 1020 manifests a much smaller dip 1022 as compared to corrupted signal 1010, i.e., an improved value relative to corrupted signal 1010 during the bad data event. These corrected values during the bad data event are better than, i.e., nearer to, what the actual values should have been without the bad data, but in the exemplary embodiment, there is still a noticeable dip at 1022.

Figure 11:
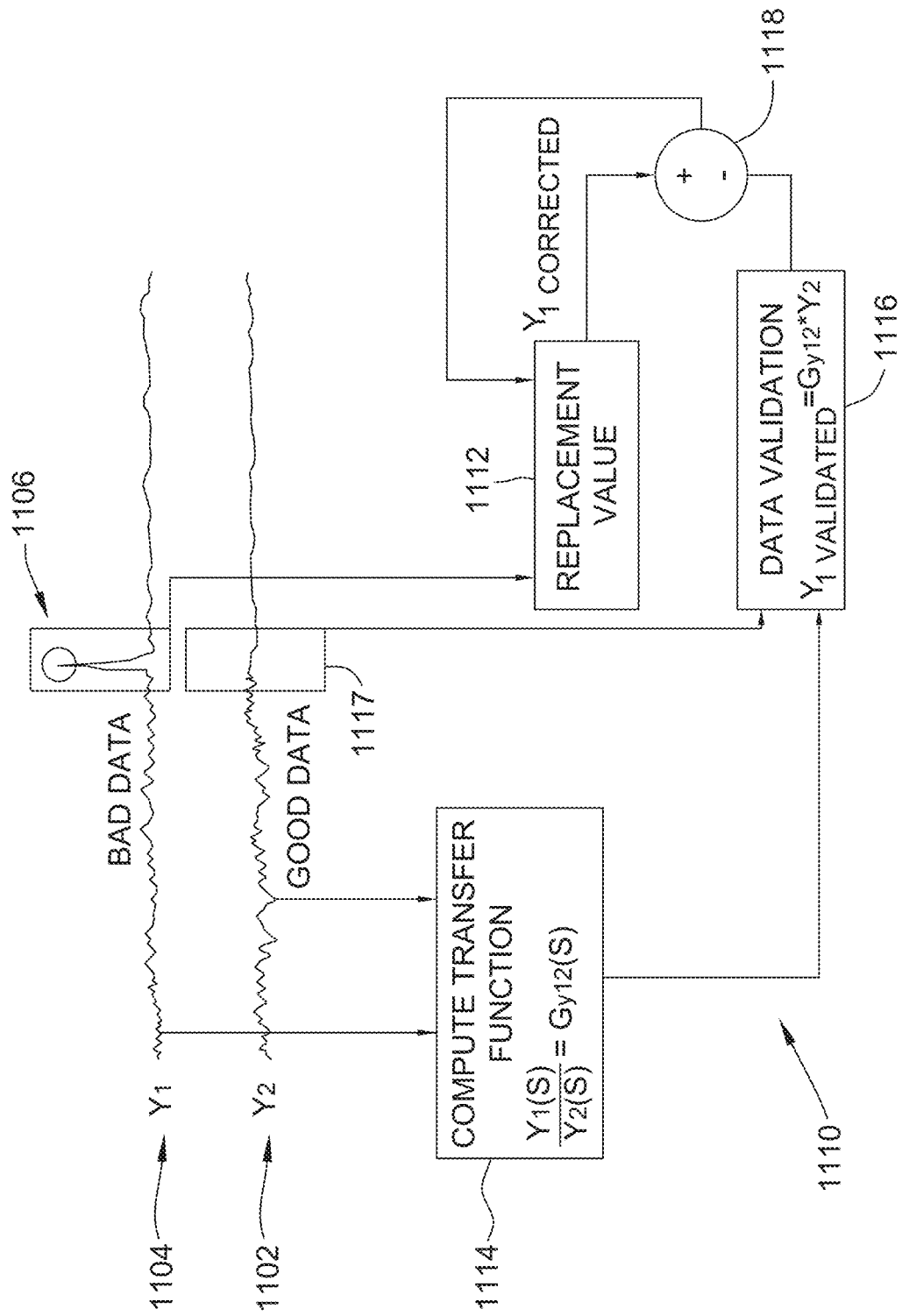
FIG. 11 is a diagram illustrating an exemplary "good" data stream and a "bad" data stream from the PMUs shown in FIG. 3, with an exemplary flow diagram for validating and correcting replacement value.

FIG. 11 is a diagram illustrating an exemplary "good" data stream 1102 and a "bad" data stream 1104 from PMUs 320 (shown in FIG. 3), along with an exemplary flow diagram 1110 for validating and correcting replacement values. In some embodiments, bad data stream 1104 is similar to corrupted signal 1010 (shown in FIG. 10). In the exemplary embodiment shown in FIG. 11, "bad" data stream 1104 contains an anomaly 1106, i.e., bad data. In this case, anomaly 1106 is a spike in the data value. A replacement value 1112, i.e., a data correction, is computed as described above. Flow diagram 1110 represents an exemplary process for validating and correcting replacement value 1112 prior to replacing values associated with the bad data.

In the exemplary embodiment, at least one other data stream is used to validate replacement value 1112. More specifically, a transfer function is computed 1114 with good data from at least two signals. This transfer function, along with one or more non-corrupted signals such as good data stream 1102, is used to generate a data validation value 1116. This data validation value 1116 is compared with the output of the data correction algorithm described above, i.e., replacement value 1112, to validate the results. Further, any difference in the value generated from the correction algorithm, i.e., replacement value 1112, also referred to as $Y_{1corrected}$, and the value generated using the transfer function, i.e., data validation value 1116, also referred to as $Y_{1validated}$, will be fed back into the correction algorithm to improve that algorithm.

During operation, PDC system 120 (shown in FIG. 3) receives good data stream 1102 and bad data stream 1104 from one or more PMU's 320 (shown in FIG. 3). PDC system 120 computes a transfer function 1114 using values from both data streams 1102 and 1104. At time of anomaly 1106, PDC system 120 computes a data validation value using both the transfer function 1114 and a data value 1117, "$Y_2$," for good data stream 1102 to compute data validation value 1116. This data validation value 1116 represents an approximation of what bad data stream 1104 should have been based on comparison of bad data stream 1104 with good data stream 1102, i.e., the transfer function 1114. Data validation value 1116 is then compared to replacement value 1112, and a subsequent error 1118 is generated. Error 1118 helps quantify the accuracy and/or integrity of replacement value 1112.

Also, in the exemplary embodiment, there are two basic types of algorithms that may be used for computing 1114 the validation transfer function, i.e., block processing and recursive. In block processing algorithms, the estimation is done using a window of data. For each new window of data, a new estimate is calculated. In recursive algorithms, the estimate is updated with each new sample of the data. The new estimate is obtained using a combination of the new data point and the previous estimate. The recursive algorithm estimates data samples a step ahead. The system behavior to be controlled may be expressed as the following auto-regressive moving average (ARMA) model:

$$y(t) = -\sum_{i=1}^{n_a} a_i y(t-i) + \sum_{i=1}^{n_b} b_i u(t-k-i) + e(t), \quad (4)$$

which may be expressed in z-domain as:

$$A(z)Y(z) = z^{-k} B(z) U(z) + E(z), \quad (5)$$

where:

$$A(z) = 1 + \Sigma_{i=1}^{n_a} a_i z^{-i}, B(z) = \Sigma_{i=1}^{n_b} b_i z^{-i}, \quad (6)$$

and where $n_a$ is the order of the autoregressive (AR) part of the ARMA model, $a_1, a_2, \ldots, a_n$ are the coefficients of the AR part of the model, i.e., of the recursive linear filter, $n_b$ is the order of the moving average (MA) part of the ARMA model, $b_1$, $b_2$, ..., $b_n$ are the coefficients of the MA part of the model, i.e., of the non-recursive linear filter, $u_t$ are samples of the input signal, $y_t$ are samples of the output signal, $e_t$ are the uncorrelated output errors, k is the sample delay, and A(z), B(z), U(z), etc., are quantities in z-domain.

In the exemplary embodiment, k is the plant delay, and the plant delay is 1 considering the presence of a zero-order hold (ZOH) due to the digital to analog converter (DAC) at the system input and error e(t) is a zero mean random noise with the Gaussian distribution. Recursive estimation method may be employed to estimate the parameters of $\hat{\theta}$ (see equation (7) below) online. The square of the prediction error $\epsilon(t)$ is minimized with the parameter vector $\theta(t)$ converging asymptotically to the actual values. The parameter vector and the prediction error are expressed in equations (5) and (6) respectively:

$$\hat{\theta} = [\hat{a}_1, \ldots \hat{a}_{n_a}, \hat{b}_1, \ldots \hat{b}_{n_b}]^T \qquad (7)$$

and $$\epsilon(t) = y(t) - \hat{y}(t). \qquad (8)$$

The predicted output is given by:

$$\hat{y}(t) = X^T(t)\hat{\theta}(t-1), \qquad (9)$$

where X(t) is the regressor containing the past input and output samples:

$$X(t) = [-y(t-1), \ldots -y(t-n_a), u(t-1), \ldots u(t-n_b)]^T. \qquad (10)$$

Figure 12:
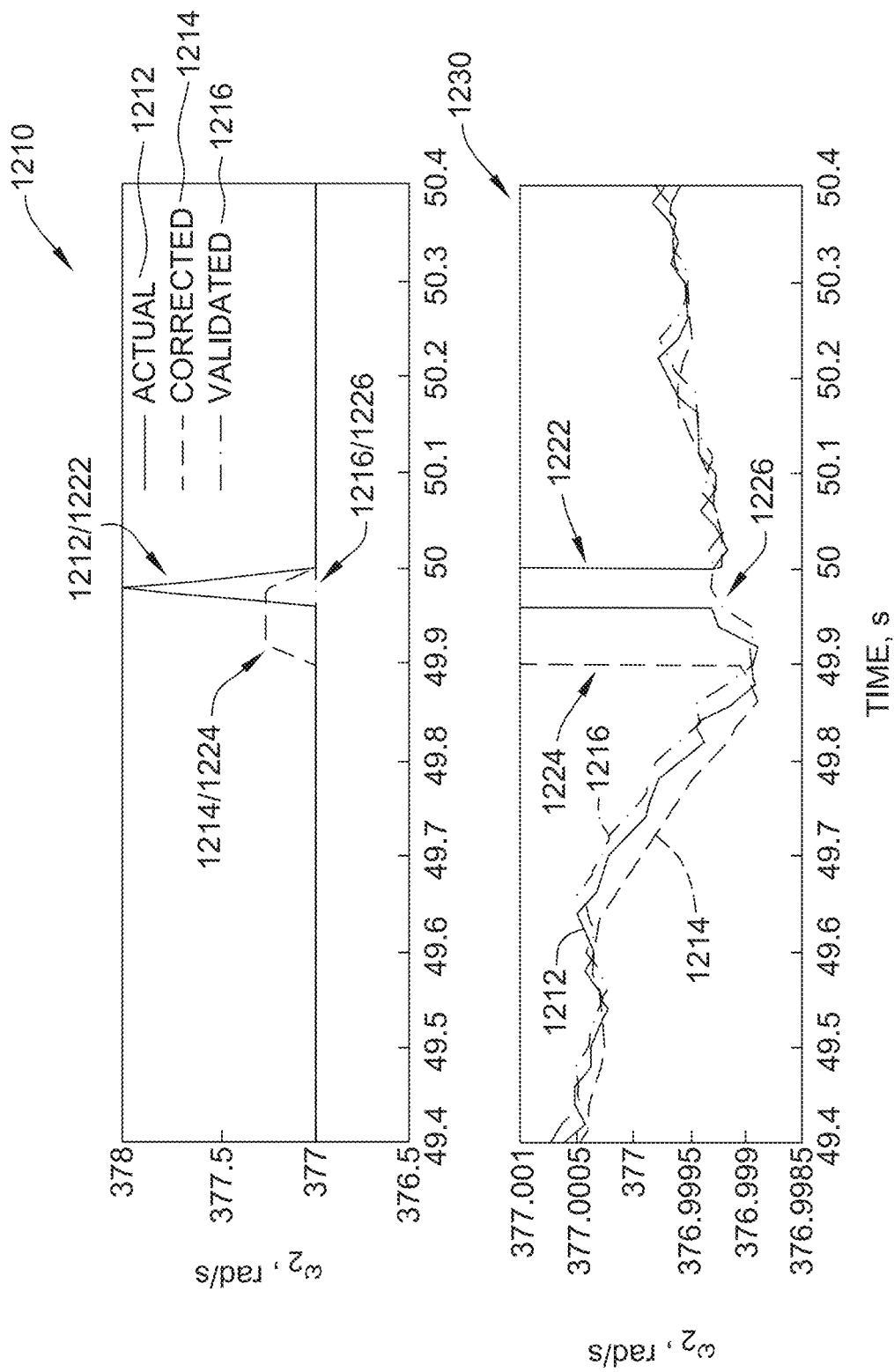
FIG. 12 is an exemplary graph of bad data during an ambient condition at approximately time t=50 seconds, and a more refined view graph of the same occurrence.
Figure 13:
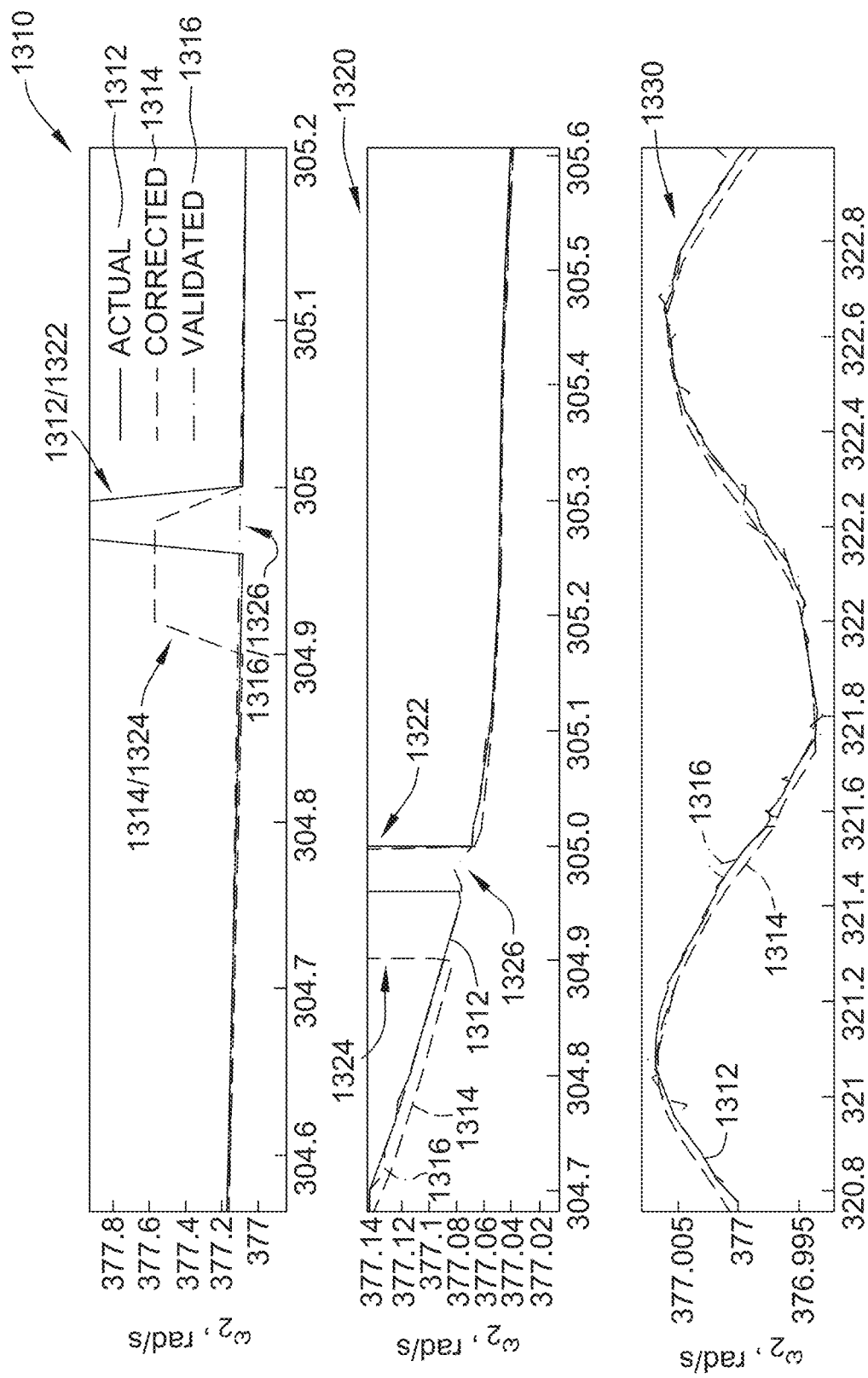
FIG. 13 is an exemplary graph of bad data during a transient condition, i.e., a disturbance, at approximately time t=305 seconds, a more refined view graph of the same disturbance and bad data, and a graph at a later time after the initial disturbance.

FIGS. 12 and 13 are exemplary graphs comparing actual data signals with signals after correction and after further validation. FIG. 12 represents bad data inserted during an ambient condition at approximately time t=50 seconds. FIG. 13 represents bad data inserted during a transient condition at approximately time t=305 seconds.

FIG. 12 is an exemplary graph 1210 of bad data during an ambient condition at approximately time t=50 seconds, and a more refined view graph 1230 of the same occurrence. In both graphs 1210 and 1230 in the exemplary embodiment, an actual signal 1212 of generator speed over time is depicted, and represents a plot of the actual signal received from a generator, such as generator G2 (shown in FIG. 5). Bad data occurs within actual signal 1212 at approximately time t=50 seconds, manifesting a spike at 1222. Corrected signal 1214 represents a plot of the actual signal 1212 after processing through the corrections systems and methods described above in reference to FIG. 10. In the exemplary embodiment, actual signal 1212 is processed continuously, i.e., every data sample, to generate corrected signal 1214. In some embodiment, corrected signal 1214 may only be computed and inserted when bad data is detected. Validated signal 1216 represents a plot of the corrected signal 1214 after processing through the systems and methods described above in reference to FIG. 11. In the exemplary embodiment, corrected signal 1214 is processed continuously, i.e., every data sample, to generated validated signal 1216. In some embodiments, validated signal 1216 may only be computed and inserted when bad data is detected, i.e., when corrected signal 1214 is computed.

In the exemplary embodiment, corrected signal 1214 shows a less pronounced but still noticeable plateau at element 1224 during the bad data event at approximately time t=50 seconds. Validated signal 1216, however, smooth's out that plateau at element 1226, and appears to be a much closer to an accurate representation of what the actual signal 1212 values would have been but for the bad data.

FIG. 13 is an exemplary graph 1310 of bad data during a transient condition, i.e., a disturbance, at approximately time t=305 seconds, a more refined view graph 1320 of the same disturbance and bad data, and a graph 1330 at a later time after the initial disturbance. In some embodiments, actual signal 1312, corrected signal 1314, and validated signal 1316 are similar to actual signal 1212, corrected signal 1214, and validated signal 1216 (all shown in FIG. 12). In all three graphs 1310, 1320, and 1330, an actual signal 1312 of generator speed over time is depicted, and represents a plot of the actual signal received from a generator, such as generator G2 304 (shown in FIG. 5). Bad data occurs within actual signal 1312 at approximately time t=305 seconds, manifesting a spike at 1322. Validated signal 1316 represents a plot of the corrected signal 1314 after processing through the systems and methods described above in reference to FIG. 11.

In the exemplary embodiment, corrected signal 1314 shows a less pronounced but still noticeable plateau at element 1324 during the bad data event at approximately time t=305 seconds. Validated signal 1316, however, smooth's out that plateau at element 1326, and appears to be a much closer to an accurate representation of what the actual signal 1312 values would have been but for the bad data. Graph 1430 depicts generator speed at a later time, and shows that each of the three plots 1312, 1314, and 1316 are similar when no bad data occurs.

Figure 14:
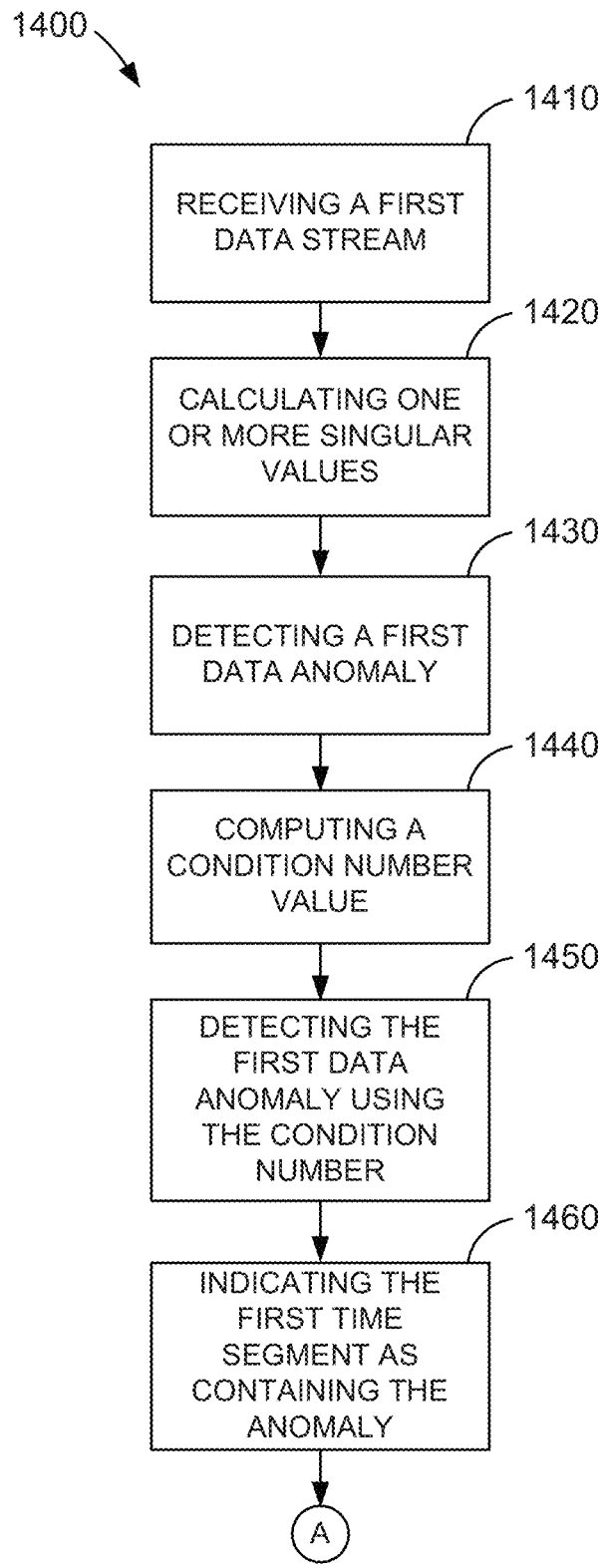
FIG. 14 is a flow chart of an exemplary method of detecting bad data in the data stream shown in FIG. 4 using the PDC system shown in FIG. 3.
Figure 15:
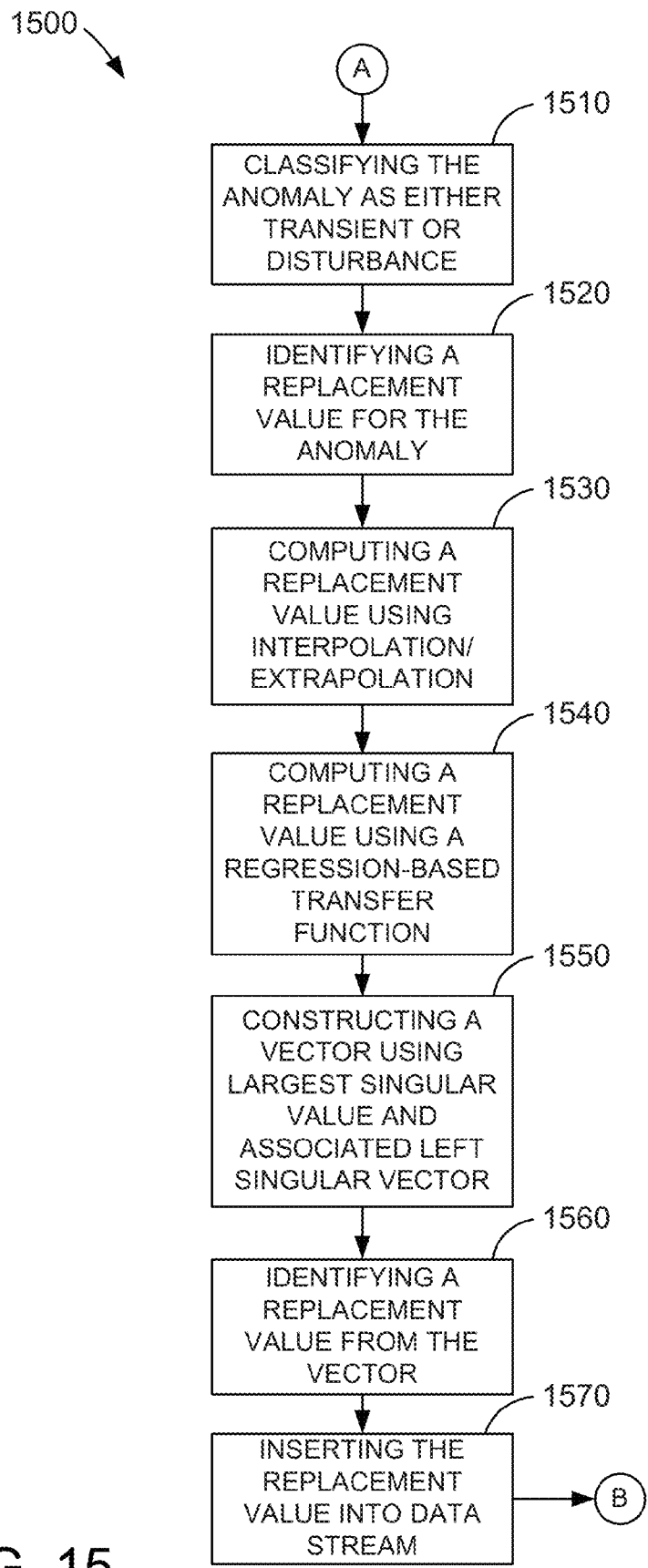
FIG. 15 is a flow chart of an exemplary method for correcting bad data values associated with the data anomalies, such as anomalies identified by the method shown in FIG. 14 using the PDC system shown in FIG. 3.
Figure 16:
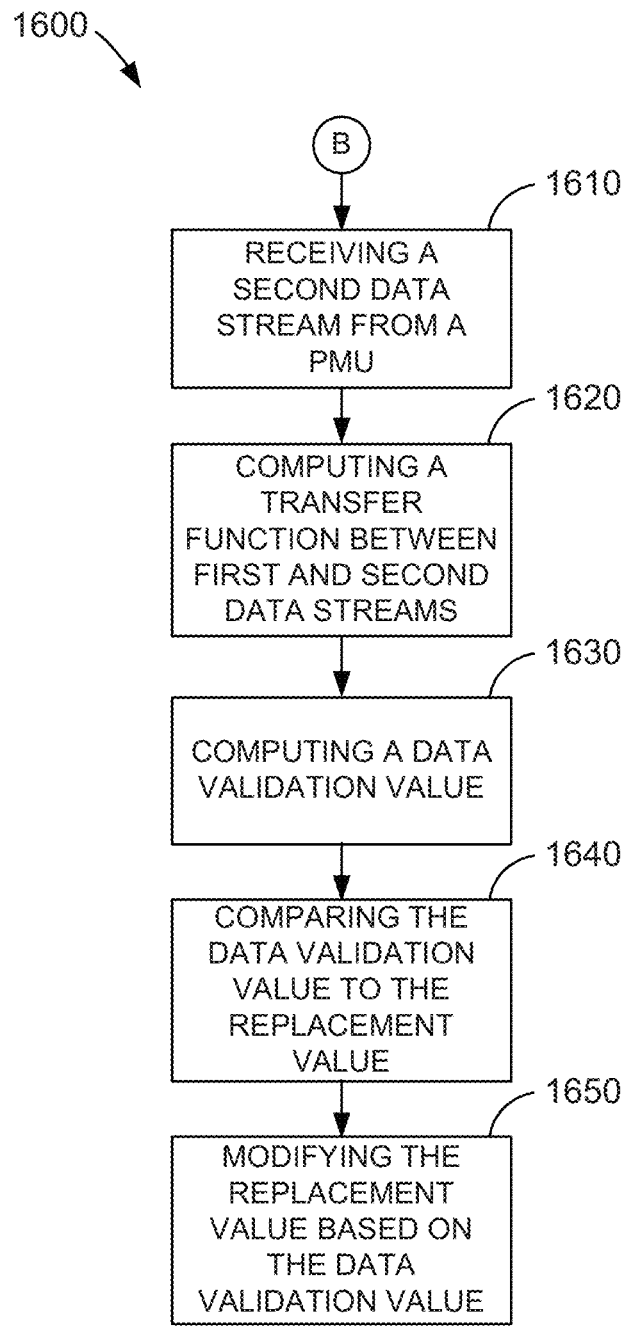
FIG. 16 is a flow chart of an exemplary method for validating and/or tuning replacement values associated with the data anomalies, such as the replacement values identified in the method shown in FIG. 15 using the PDC system shown in FIG. 3.

FIGS. 14-16 are exemplary methods for detecting, correcting, and validating data anomalies in data streams. FIG. 14 shows an exemplary method of detecting data anomalies in data streams. FIG. 15 shows an exemplary method of correcting data anomalies in data streams. FIG. 16 shows an exemplary method of validating the correction values. While the method steps in FIGS. 14-16 are shown in a particular order and occurring together, it should be understood that any combination of method steps and/or order of the method steps that enables the operation of the systems and methods described herein is within the scope of this disclosure.

FIG. 14 is a flow chart of an exemplary method 1400 of detecting bad data in the data stream shown in FIG. 4 using PDC system 120 (shown in FIG. 3). In the exemplary embodiment, method 1300 includes receiving 1410 from a PMU, such as PMU 320 (shown in FIG. 3), a first data stream. Method 1400 also includes calculating 1420 one or more singular values associated with the first data stream. In some embodiments, calculating 1420 one or more singular values includes performing singular value decomposition on a matrix representing a window of values from the first data stream. Method 1400 further includes detecting 1430 a first data anomaly within the first data stream using at least the one or more singular values, the first data anomaly occurring during a first time segment within the first data stream. In some embodiments, detecting 1430 the first data anomaly includes detecting the first data anomaly if a singular value of the one or more singular values is above a threshold value. In other embodiments, method 1400 includes computing 1440 a condition number value as a ratio between a largest singular value and a smallest singular value of the plurality of singular values and detecting 1450 the first data anomaly using the condition number value, thereby distinguishing a data anomaly condition from a disturbance condition. Method 1400 also includes indicating 1460 the first time segment as containing the first data anomaly.

FIG. 15 is a flow chart of an exemplary method 1500 for correcting bad data values associated with the data anomalies, such as anomalies identified by method 1400 (shown in FIG. 14) using PDC system 120 (shown in FIG. 3). Method 1500 includes classifying 1510 a first data anomaly, such as anomaly 1106 (shown in FIG. 11), as one of an ambient condition and a disturbance condition. Method 1500 also includes identifying 1520 at least one replacement value, such as replacement value 1112 (shown in FIG. 11), for the first data anomaly. In some embodiments, identifying 1520 a replacement value includes computing 1530 at least one replacement value using at least one of interpolation and extrapolation. In other embodiments, computing 1530 is performed if the first data anomaly is classified as a disturbance condition. In still other embodiments, identifying 1520 a replacement value includes computing 1540 at least one replacement value using a regression-based transfer function. In still other embodiments, computing 1540 is performed if the first data anomaly is classified as an ambient condition. In other embodiments, method 1500 includes constructing 1550 a vector using the largest singular value of the one or more singular values and a left singular vector corresponding to the largest singular value and identifying 1560 a replacement value associated with the first data anomaly based at least in part on the vector. Method 1500 further includes inserting 1570 the at least one replacement value within the first data stream, thereby eliminating at least a portion of the first data anomaly. While the exemplary embodiment is illustrated as identifying an anomaly in a data stream using method 1400, it should be understood that method 1500 may be practiced on an anomaly identified by any means that enables the systems and methods described herein.

FIG. 16 is a flow chart of an exemplary method 1600 for validating and/or tuning replacement values associated with the data anomalies, such as the replacement values identified in method 1500 (shown in FIG. 15) using PDC system 120 (shown in FIG. 3). Method 1600 includes receiving 1610 a second data stream from a PMU, such as PMU 320 (shown in FIG. 3). Method 1600 also includes computing 1620 a transfer function, such as transfer function 514 (shown in FIG. 5), between the first data stream and a second data stream prior to the occurrence of the first data anomaly. Method 1600 further includes computing 1630, after the occurrence of the first data anomaly, a data validation value, such as model value 1116 (shown in FIG. 11), for the first data stream based at least in part on the transfer function and a value of the second data stream at a time corresponding to the first data anomaly. Method 1600 also includes comparing 1640 the data validation value to the at least one replacement value. In some embodiments, method 1600 includes modifying 1650 the at least one replacement value based at least in part on the data validation value. While the exemplary embodiment is illustrated as identifying an anomaly in a data stream using method 1400 (shown in FIG. 14) and/or validating and/or tuning replacement values associated with the data anomalies using method 1500 (shown in FIG. 15), it should be understood that method 1600 may be practiced on an anomaly identified by any means that enables the systems and methods described herein, and on a replacement value identified by any means that enables the systems and methods described herein.

Figure 17:
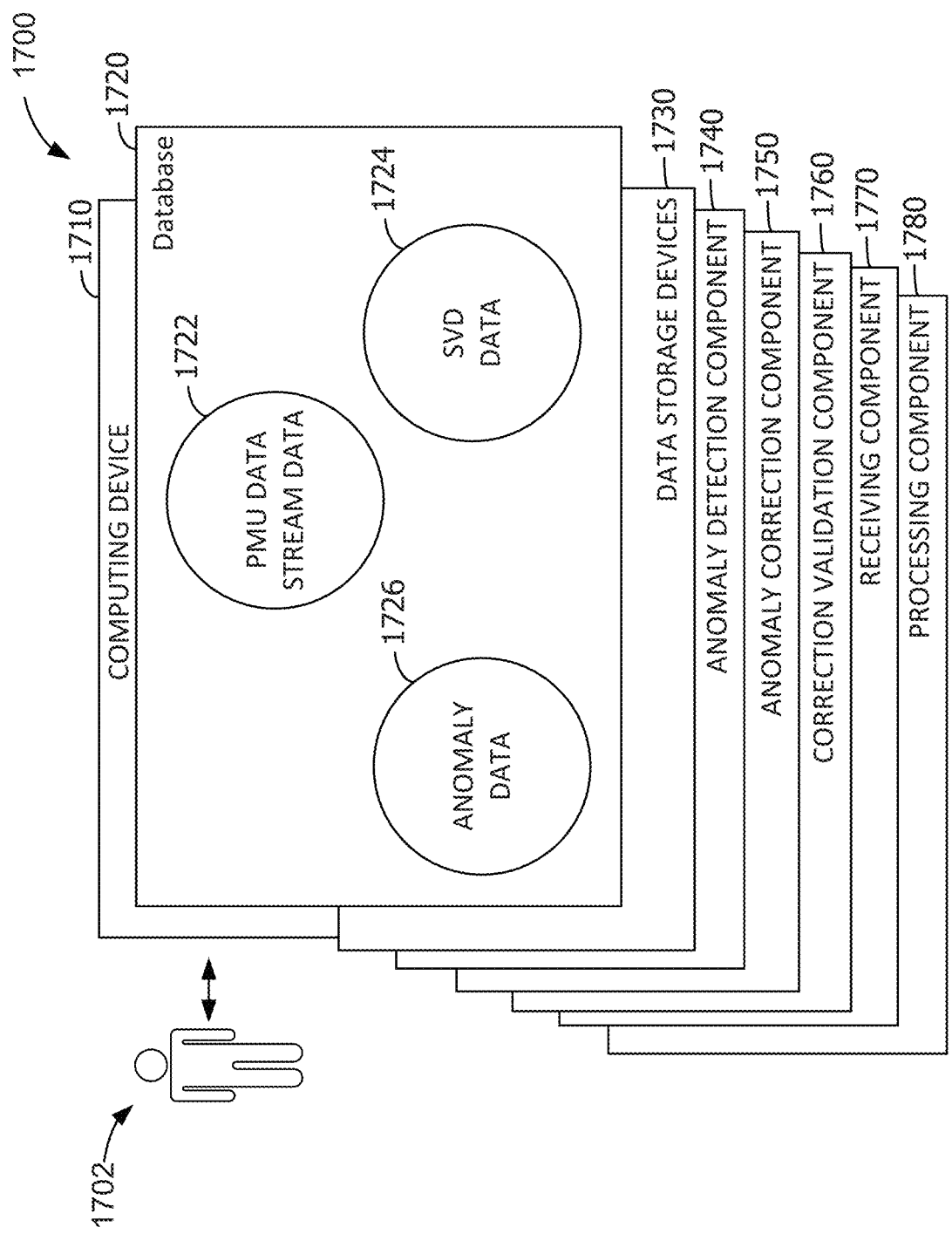
FIG. 17 illustrates an example configuration of a database within a computing device, along with other related computing components, that may be used during analysis and operations on the data streams as described herein.

FIG. 17 illustrates an example configuration 1700 of a database 1720 within a computing device 1710, along with other related computing components, that may be used during analysis and operations on the data streams as described herein. Database 1720 is coupled to several separate components within computing device 1710, which perform specific tasks. In the example embodiment, computing device 1710 may be PDC system 120 (shown in FIGS. 2 and 3).

In the example embodiment, database 1720 includes PMU data stream data 1722, SVD data 1724, and anomaly data 1726. PMU data 1722 includes information associated with data streams from devices such as PMU 320 (shown in FIG. 3). SVD data 1724 includes information associated with single value decomposition of data stream data 1722, such as the singular values illustrated in graph 450 (shown in FIG. 4). Anomaly data 1726 includes information associated with anomaly detection, correction, and verification, such as identified anomalies 1106 (shown in FIG. 11) and associated time segments, transfer functions such as transfer function 1114 (shown in FIG. 11), replacement values such as replacement value 1112 (shown in FIG. 11), and/or data validation values 1116 and comparison errors 1118 (shown in FIG. 11).

Computing device 1710 includes the database 1720, as well as data storage devices 1730. Computing device 1710 also includes an anomaly detection component 1740 for receiving data streams from PMUs 320 and detecting anomalies as described above. Computing device 1710 also includes an anomaly correction component 1750 for calculating replacement values to be inserted into data streams. A correction validation component 1760 is also included for validating and correcting replacement values. Further, computing device 1710 includes a receiving component 1770 for communicating with PMU's 320. A processing component 1780 assists with execution of computer-executable instructions associated with the system.

The embodiments illustrated and described herein, as well as embodiments not specifically described herein, but, within the scope of aspects of the disclosure, constitute exemplary means for detecting, correcting, and validating bad data in data streams. For example, PDC system 120, and any other similar computer device added thereto or included within, when integrated together, include sufficient computer-readable storage media that is/are programmed with sufficient computer-executable instructions to execute processes and techniques with a processor as described herein. Specifically, PDC system 120 and any other similar computer device added thereto or included within, when integrated together, constitute an exemplary means for detecting, correcting, and validating bad data in data streams.

The above-described systems and methods provide a way to detect, correct, and validate bad data in data streams. PMU's sample readings such as voltage and current values from an electrical power transmission network and transmit these values as data streams to a centralized PDC. The embodiments described herein allow for the PDC to detect and correct errors in the data streams prior to the data's use in administration and management of the transmission network. Detecting anomalies in the data stream, such as from missing or erroneous data, allows identification of unreliable data. Once an anomaly is identified, replacement values are calculated and inserted into the data stream, thereby replacing the bad data values. The replacement values can be verified and/or modified by checking the replacement values against another data stream. If the replacement value deviates too much from the other data stream, the replacement value may be adjusted.

An exemplary technical effect of the methods, systems, and apparatus described herein includes at least one of: (a) identifying anomalies within data streams coming from a PMU; (b) generating replacement values for the anomalous data; (c) comparing the replacement value against another data stream; (d) increase the reliability of replacement values; and (e) replacing bad values in the data stream.

Exemplary embodiments of systems and methods for detecting, correcting, and validating bad data in data streams are described above in detail. The systems and methods described herein are not limited to the specific embodiments described herein, but rather, components of systems and/or steps of the methods may be utilized independently and separately from other components and/or steps described herein. For example, the methods may also be used in combination with other systems involving analysis of data streams, and are not limited to practice with only the transmissions systems and methods as described herein. Rather, the exemplary embodiments can be implemented and utilized in connection with many other data stream analysis applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for managing occurrences of data anomalies in a data stream, said computer system comprising a processor in communication with the data stream, said processor programmed to: receive a first data stream from a phasor measurement unit; calculate a plurality of singular values using the first data stream; detect a first data anomaly within the first data stream using the plurality of singular values, the first data anomaly occurring during a first time segment; indicate the first time segment as containing the first data anomaly; wherein said processor is further programmed to: determine a largest singular value from the plurality of singular values; determine a smallest singular value from the plurality of singular values; compute a condition number value as a ratio between the largest singular value and the smallest singular value; and detect the first data anomaly using the condition number value, thereby facilitating distinguishing a data anomaly condition from a transient condition.

2. The computer system in accordance with claim 1, wherein said processor is further programmed to perform singular value decomposition on a matrix representing a window of values populated from the first data stream.

3. The computer system in accordance with claim 1, wherein said processor is further programmed to detect the first data anomaly if a singular value of the plurality of singular values exceeds a threshold value.

4. The computer system in accordance with claim 1, wherein said processor is further programmed to:
receive a plurality of data streams from a plurality of phasor measurement units; and
calculate the plurality of singular values using the plurality of data streams.

5. The computer system in accordance with claim 1, wherein said processor is further programmed to:
determine a largest singular value from the plurality of singular values;
determine a left singular vector corresponding to the largest singular value;
construct a vector using the largest singular value and the left singular vector;
identify a replacement value associated with the first data anomaly based at least in part on the vector; and
insert the replacement value within the first data stream, thereby eliminating at least a portion of the first data anomaly.

6. The computer system in accordance with claim 1, wherein said processor is further programmed to:
classify the first data anomaly as occurring during one of an ambient condition and a transient condition;
compute a replacement value using at least one of interpolation and extrapolation if the first data anomaly is classified as occurring during a transient condition;
compute the replacement value using a regression-based transfer function if the first data anomaly is classified as occurring during an ambient condition; and
insert the replacement value within the first data stream, thereby eliminating at least a portion of the first data anomaly.

7. The computer system in accordance with claim 1, wherein said processor is further programmed to:
receive a second data stream from another phasor measurement unit, the second data stream including at least one value at a time corresponding to the first data anomaly;
compute a transfer function between the first data stream and the second data stream;
identify a replacement value associated with the first data anomaly;
compute a data validation value for the first data stream based at least in part on the transfer function and the at least one value;
compare the data validation value to the replacement value; and
modify the replacement value based at least in part on the data validation value.

8. At least one non-transitory computer-readable storage media having computer-executable instructions embodied thereon, wherein when executed by at least one processor, the computer-executable instructions cause the processor to:
receive a first data stream from a phasor measurement unit;
calculate a plurality of singular values using the first data stream;
detect a first data anomaly within the first data stream using the plurality of singular values, the first data anomaly occurring during a first time segment;
indicate the first time segment as containing the first data anomaly;
wherein the computer-executable instructions further cause the processor to:
determine a largest singular value from the plurality of singular values;
determine a smallest singular value from the plurality of singular values;
compute a condition number value as a ratio between the largest singular value and the smallest singular value; and
detect the first data anomaly using the condition number value, thereby facilitating distinguishing a data anomaly condition from a transient condition.

9. The computer-readable storage media of claim 8, wherein the computer-executable instructions further cause the processor to perform singular value decomposition on a matrix representing a window of values populated from the first data stream.

10. The computer-readable storage media of claim 8, wherein the computer-executable instructions further cause the processor to detect the first data anomaly if a singular value of the plurality of singular values exceeds a threshold value.

11. The computer-readable storage media of claim 8, wherein the computer-executable instructions further cause the processor to:
 receive a plurality of data streams from a plurality of phasor measurement units; and
 calculate the plurality of singular values using the plurality of data streams.

12. The computer-readable storage media of claim 8, wherein the computer-executable instructions further cause the processor to:
 determine a largest singular value from the plurality of singular values;
 determine a left singular vector corresponding to the largest singular value;
 construct a vector using the largest singular value and the left singular vector;
 identify a replacement value associated with the first data anomaly based at least in part on the vector; and
 insert the replacement value within the first data stream, thereby eliminating at least a portion of the first data anomaly.

13. The computer-readable storage media of claim 8, wherein the computer-executable instructions further cause the processor to:
 classify the first data anomaly as occurring during one of an ambient condition and a transient condition;
 compute a replacement value using at least one of interpolation and extrapolation if the first data anomaly is classified as occurring during a transient condition;
 compute the replacement value using a regression-based transfer function if the first data anomaly is classified as occurring during an ambient condition; and
 insert the replacement value within the first data stream, thereby eliminating at least a portion of the first data anomaly.

14. The computer-readable storage media of claim 8, wherein the computer-executable instructions further cause the processor to:
 receive a second data stream from another phasor measurement unit, the second data stream including at least one value at a time corresponding to the first data anomaly;
 compute a transfer function between the first data stream and the second data stream;
 identify a replacement value associated with the first data anomaly;
 compute a data validation value for the first data stream based at least in part on the transfer function and the at least one value;
 compare the data validation value to a replacement value; and
 modify the replacement value based at least in part on the data validation value.

15. A computer-based method of managing occurrences of data anomalies in a data stream using a computing device including at least one processor, said method comprising:
 receiving, by the computing device, a first data stream from a phasor measurement unit;
 calculating, by the processor, a plurality of singular values using the first data stream;
 detecting a first data anomaly within the first data stream using the plurality of singular values, the first data anomaly occurring during a first time segment;
 indicating the first time segment as containing the first data anomaly;
 wherein detecting the first data anomaly further comprises:
  determining a largest singular value from the plurality of singular values;
  determining a smallest singular value from the plurality of singular values;
  computing a condition number value as a ratio between the largest singular value and the smallest singular value; and
  detecting the first data anomaly using the condition number value, thereby facilitating distinguishing a data anomaly condition from a transient condition.

16. The method in accordance with claim 15, wherein said calculating the plurality of singular values comprises performing singular value decomposition on a matrix representing a window of values populated from the first data stream.

17. The method in accordance with claim 15, wherein said detecting the first data anomaly includes identifying the first data anomaly if a singular value of the plurality of singular values exceeds a threshold value.

18. The method in accordance with claim 15 further comprising:
 receiving a plurality of data streams from a plurality of phasor measurement units; and
 calculating the plurality of singular values using the plurality of data streams.

19. The method in accordance with claim 15 further comprising:
 determining a largest singular value from the plurality of singular values;
 determining a left singular vector corresponding to the largest singular value;
 constructing a vector using the largest singular value and the left singular vector;
 identifying a replacement value associated with the first data anomaly based at least in part on the vector; and
 inserting the replacement value within the first data stream, thereby eliminating at least a portion of the first data anomaly.

20. The method in accordance with claim 15 further comprising:
 classifying the first data anomaly as occurring during one of an ambient condition and a transient condition;
 computing a replacement value using at least one of interpolation and extrapolation if the first data anomaly is classified as occurring during a transient condition;
 computing the replacement value using a regression-based transfer function if the first data anomaly is classified as occurring during an ambient condition; and
 inserting the replacement value within the first data stream, thereby eliminating at least a portion of the first data anomaly.

21. The method in accordance with claim 15 further comprising:
 receiving a second data stream from another phasor measurement unit, the second data stream including at least one value at a time corresponding to the first data anomaly;
 computing a transfer function between the first data stream and the second data stream;
 identifying a replacement value associated with the first data anomaly;
 computing a data validation value for the first data stream based at least in part on the transfer function and the at least one value;
 comparing the data validation value to a replacement value; and
 modifying the replacement value based at least in part on the data validation value.

* * * * *